United States Patent [19]

Twerdochlib

[11] Patent Number: 4,901,061
[45] Date of Patent: Feb. 13, 1990

[54] INSTRUMENTATION AND MONITORING SYSTEMS EMPLOYING DIFFERENTIAL TEMPERATURE SENSORS

[75] Inventor: Michael Twerdochlib, Oviedo, Fla.

[73] Assignee: Westinghouse Electric Corp., Pittsburgh, Pa.

[21] Appl. No.: 196,707

[22] Filed: May 20, 1988

Related U.S. Application Data

[63] Continuation-in-part of Ser. No. 58,956, Jun. 5, 1987, abandoned.

[51] Int. Cl.$^4$ .............................................. G08B 21/00
[52] U.S. Cl. .................................. 340/604; 340/514; 340/516; 340/584; 340/587; 340/501; 73/295; 376/247; 364/557; 364/186; 374/10; 374/164
[58] Field of Search .................. 340/501, 514–516, 340/584, 587, 604, 622, 618, 620; 73/295; 374/4, 5, 10, 11, 163, 164; 376/247, 259; 364/550, 557, 579, 580, 184, 185, 186; 136/232, 242

[56] References Cited

U.S. PATENT DOCUMENTS

| | | | |
|---|---|---|---|
| 3,366,942 | 1/1968 | Deane | 340/608 |
| 3,898,638 | 8/1975 | Deane et al. | 340/606 |
| 4,050,418 | 9/1977 | Watanabe | 376/247 |
| 4,063,228 | 12/1977 | Eggenberger et al. | 340/604 |
| 4,167,003 | 9/1979 | Stansbury | 340/501 |
| 4,418,035 | 11/1983 | Smith | 376/247 |
| 4,439,396 | 3/1984 | Rolstad | 374/10 |
| 4,440,717 | 4/1984 | Bevilacqua et al. | 73/295 |
| 4,441,329 | 4/1984 | Dawley | 236/94 |
| 4,449,403 | 5/1984 | McQueen | 374/142 |
| 4,483,631 | 11/1984 | Kydd | 376/247 |
| 4,571,689 | 2/1986 | Hildebrand et al. | 364/550 |
| 4,586,149 | 4/1986 | Stillman et al. | 364/184 |
| 4,778,538 | 10/1988 | Lyman | 136/232 |

OTHER PUBLICATIONS

"The Self-Validating Water Induction Monitoring System," Solartron Protective Systems, a division of Solartron Transducers, owned by Schlumberger, under its registered trademark "HYDRATECT-2455D."

Brochure of Fluid Components, Inc. entitled "Liquid Level & Interface Controllers," printed 4-85.

Primary Examiner—Joseph A. Orsino
Assistant Examiner—Jill D. Jackson
Attorney, Agent, or Firm—D. C. Abeles

[57] ABSTRACT

Instrumentation and monitoring systems utilize, as differential temperature sensors, heated, split-well thermowells of duplex design, mounted to the sidewall of a pressure vessel and communicating through a penetration in the sidewall with the fluid state within the vessel. Each probe has at least one parallel axial bore therein, a related, selected pair of probes receiving respective heater and temperature sensing elements in the associated bores and together functioning as a differential temperature sensor producing distinguishable, differential temperature outputs representative of the presence of steam versus water. The systems monitor the differential temperature outputs of plural such sensors to produce alarm indications and perform verification and error checking of the sensor output indications. Duplex sensor embodiments permit toggling between different, selected such pairs of probes for on-line testing and verification of monitored conditions represented by the sensor output indications and of the operability of the elements and supporting circuits, under automatic and manual controls, and with on-line substitution of complementary elements in the event of element failure.

30 Claims, 12 Drawing Sheets

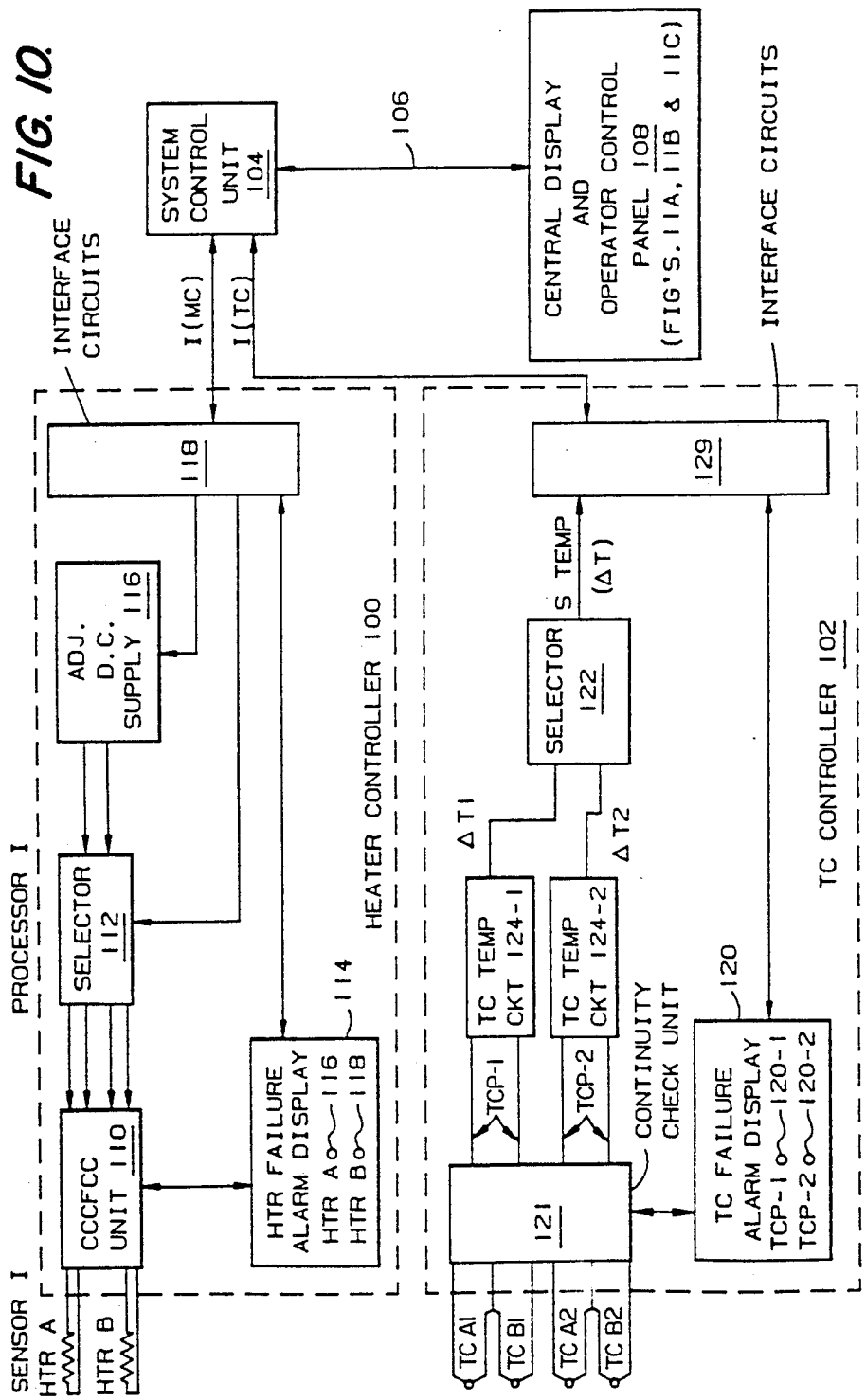

INSTRUMENTATION AND MONITORING SYSTEMS EMPLOYING DIFFERENTIAL TEMPERATURE SENSORS

CROSS-REFERENCE TO RELATED APPLICATIONS

This application is a continuation-in-part of Application Ser. No. 058,956 filed June 5, 1987, now abandoned, in the name of the same inventor as herein and assigned to the common assignee as herein.

This application furthermore is related to the concurrently-filed application entitled "DIFFERENTIAL TEMPERATURE SENSORS," Application Ser. No. 196,706 a continuation-in-part of the same above-identified application and in the name of the same inventor and assigned to the common assignee, as herein. Both of the cross-referenced applications are incorporated by reference herein.

This application further is related to Application Ser. No. 07/077,666 filed July 13, 1987, now Pat. No. 4,778,538 in the name of W. G. Lyman entitled "DUAL TEMPERATURE SENSING DEVICE HAVING TWIN WELL THERMOWELL FOR DUAL RESISTANCE TEMPERATURE DETECTORS," assigned to the common assignee herein.

BACKGROUND OF THE INVENTION

1. Field of the Invention

This invention relates to instrumentation and monitoring systems employing differential temperature sensing, or detecting, devices and, more particularly, to such systems employing improved, split-well differential temperature sensors, or detectors, for detecting the presence of water in a pressure vessel, such as a steam extraction pipe of a steam turbine system.

2. State of the Relevant Art

Differential temperature sensors, as are well known in the art, employ thermodynamic and fluid principles for selectively sensing the presence or absence of, and/or the creation or cessation of the flow of materials in a liquid or gaseous form. U.S. Pat. No. 3,366,942—Deane illustrates one form of a prior art differential temperature sensor, used as a flow stoppage detector. The sensor, or probe, comprises a pair of heat sensing probes with a heater probe thermally connected therewith. The sensing and heater probes are adapted for being introduced into a conduit through which a material may flow. The heater probe is spaced more closely to one than to the other of the sensing probes. In the absence of flow, the sensing probe closer to the heater probe is at a higher temperature than the other sensing probe; conversely, when a fluid material flows past the probes, heat is conducted away from the heater probe and thus the temperature difference between the two sensing probes decreases, or disappears.

U.S. Pat. No. 3,898,638—Deane et al., illustrates another such differential temperature sensor, having the same basic configuration as that of the earlier Deane Pat. No. 3,366,942 but represented to have an improved internal structure of the temperature sensing probes which affords increased accuracy of measurements. As noted therein, differential heating of the two temperature sensing probes by the heater probe may be accomplished in part by, for example, the heat shunt running between the heater probe and the more adjacent of the two temperature sensing probes; further, both convection and/or conduction in the medium at rest, and conduction in the shunt, serve to carry heat differentially between the probes.

Another form of such differential temperature sensing probes, again having the same basic configuration of a pair of temperature sensors and a heater element disposed adjacent to one of the two temperature sensors, is disclosed in U.S. Pat. No. 4,449,403—McQueen. The particular application of the McQueen device entails utilizing plural such sensors in a vertically stacked array within a guide tube disposed within a reactor vessel, the outputs from the plurality of sensors providing an indication of the wet/dry condition of the coolant in the region of the fuel rods, among other purposes and functions. A particular concern in such reactor vessels is the presence of voids, e.g., a steam void, displacing the reactor coolant from the nuclear fuel rods, which then are inadequately cooled and may overheat. The composite device most specifically is disclosed for use in sensing the coolant properties under three regimes: subcooled (the normal operating condition); saturated liquid (the boiling condition); and saturated vapor (a voided condition). As noted therein, the improper conditions may result in "water hammer" effects producing pressure pulses which can break pipes, pipe supports, tanks, valves and other such vital equipment.

U.S. Pat. No. 4,440,717—Bevilacqua et al. likewise discloses an instrumentation system employing plural sensors at vertically spaced elevations and positioned within a nuclear reactor vessel, each sensor comprising a heater for heating one of a pair of thermocouples wired to provide both absolute temperatures and differential temperatures therebetween, for detecting the liquid coolant level within the vessel, again employing the difference in heat transfer characteristics between heat transfer to a liquid and heat transfer to a gas or vapor to sense the liquid level. Similar such sensors and related systems for use in nuclear reactor vessels or other pressurized water systems are disclosed in U.S. Pat. Nos. 4,418,035—Smith and 4,439,396—Rolstad. The Smith '035 patent moreover illustrates a block diagram form of a multiple function monitoring system employing such sensors.

While the differential temperature sensors, or detectors, as disclosed in the above cross-referenced applications, and the instrumentation systems of the present invention have broad application, including use in sensing and monitoring pressure vessels of nuclear reactor systems as in the above-referenced patents, they have been developed with specific reference to the operation and preventive maintenance of steam turbine generators. Problems with such generators arising out of the induction of water or cool vapor into the steam turbines become more critical as the units age and particularly as they are used, increasingly, for cyclic and/or shift operation. Malfunctions of the equipment in the heat cycle can cause such induction to occur at various locations, including the main-steam inlet piping, the hot-reheat steam inlet piping, the cold-reheat steam piping, extraction connections, gland steam-sealing system, and turbine drains. Beyond the resulting structural damage and mechanical malfunctions caused by the induction of water or cool vapor, the resulting unscheduled down time of the equipment is a matter of serious concern.

In addition to the particular locations at which induction occurs, it is important to identify the various types of induction, i.e., the types of water induction events, which may occur. For example, induction may occur as a flow of a water film on the side of a pipe associated with the turbine produced typically by condensation of steam on the side of a cold pipe or from an overspray condition. Droplet or "chunk" flow may occur, visualized as a continuous projectile of water which may vary from the size of drops to walnuts and which may be mixed with steam. Slug flow may be produced, i.e., a slug of water which completely fills a section of pipe and is projected down the pipe, presumably by the flash-off of water. Two-phase flow as well has been identified, comprising generally an ill-defined "water-steam" mixture that may result from flash-off of high energy water, and may involve a core flow of solid water. Finally, a broad category exists wherein water may rise within a pipe, due to such sources as condensation, spray or flow, feed water heater tube leaks, and/or design deficiencies in the drain system, and to combinations thereof. It appears, however, that the vast majority of water induction events are of the slow rise type of the last category described, and which, moreover, may be the precursor to the other categories of water induction events. Thus, while not necessarily so limited in its scope, the sensors, or detectors of the present invention and the associated instrumentation systems are directed to this broader, last-mentioned category and thus to monitoring the condition within a pipe and more specifically for the detection of the relatively slow rise of water within a pipe associated with a turbine system. As noted, the sources of such water may be the boiler and feed water heaters, accumulation due to condensation, faulty sprayers and broken pipes, and accumulation arising from condensation within the turbine itself, in stages that operate in the wet region.

Beyond the specific sensors as disclosed in the foregoing patents, commercially available systems incorporating such differential temperature sensors for monitoring and detecting the presence of water have been developed. Solartron Protective Systems, a division of Solartron Transducers, owned by Schlumberger, offers a "Self-Validating Water Induction Monitoring System" under its registered trademark HYDRATECT—2455D. Resistivity measurements are made inside of a manifold by means of electrodes, which serve to discriminate between the resistivities of water and steam (or air). As described in its sales literature, the energized tip of an electrode is referenced to the body of the manifold, and the tip is insulated from the body by a high purity insulator. Pairs of such electrodes may be mounted in two-port manifolds in conduits, such as drain lines, to be monitored, each electrode detecting the presence of either water or steam, and its output being routed by independent connections to an electronic discrimination circuit. A discriminator circuit purportedly checks for component failures and declares same as occurring, within each electrode channel. A validation check between two electrode channels subjected to the same conditions is described as being performed, as a 5 basis for indicating whether a fault exists. The HYDRATECT—2455D system of Solartron, however, is deficient in many respects and inherently incapable of providing reliable, long-life characteristics. For example, the sensor is of generally cylindrical configuration and is adapted to be inserted through a penetration in the sidewall of a pressure vessel and secured thereto, as is conventional. A segment of the cylindrical structure comprises an annular band of insulating material, which insulates the electrode tip of the sensor from the remainder of the structure. A tight pressure seal, e.g., a porcelain to metal weld, must be provided at the respective interfaces of the insulating band with the electrode and with the remainder of the cylindrical sidewall of the sensor. The interfaces of dissimilar materials, i.e., porcelain and metal, renders in the sensor structure highly susceptible to leakage and eventually breaking, particularly in view of the rather hostile environment to which it is subjected (e.g., temperature cycling, vibration and the like). In typical experience, such sensors have a reliable lifetime only of from one to three years, at most. Not only do sensors of this type fail to provide the long-life characteristics essential to an effective monitoring system, their tendency to leak and break presents a serious threat to personnel. Moreover, because of their structure, as described and as will be appreciated, the sensors cannot be repaired or replaced while the system, which they are intended to monitor, is on-line.

Another commercial system is offered by Fluid Components, Inc. and set forth in its brochure entitled "Liquid Level & Interface Controllers," that brochure citing protection for the disclosed systems under the above-referenced Pat. Nos. 3,366,942, 3,898,638 and 4,449,403. Sensors incorporating probes as disclosed in those patents are employed for measuring temperature differentials. The specific values of the output signals are stated to be governed by the media in contact with the probes and thus, for example, liquid/gas and liquid/liquid interfaces as well as wet/dry conditions purportedly may be detected. Monitoring and calibration circuits for the liquid level and interface controllers associated with the sensors are indicated to be available. These sensors and associated controllers, however, are not suitable for the hostile environment of steam turbine systems and, particularly, for performing the requisite sensing functions for anticipating problems of water induction. For example, the sensors cannot withstand the involved high pressure and temperature conditions. The sensors, moreover, are asymmetric and inherently lack any duplex functional capability as has been determined, in accordance with the present invention, to be essential to the effective and reliable monitoring and control of such systems. For example, an important fouling test, performed by the sensor and related system of the present invention, is incapable of being performed by an asymmetric sensor and a system incorporating same; moreover, since lacking any duplex configuration, there necessarily is no capability of on-line, automatic substitution for a failed element, e.g., a heater element. The specific structure of the sensors, moreover, does not permit physical replacement of failed heater and/or thermocouple elements while on-line. Moreover, such sensors and necessarily the related systems will not work in a steam flow environment in the absence of a shield surrounding the heater and thermocouple elements, since even low steam velocities will remove heat more rapidly than water.

Despite incorporating advances in technology, currently available sensors and monitoring and alarm systems employing same, as reported in the literature above-identified, have failed to satisfy critical needs in the industry. For example, the above-noted problem of water induction in steam turbines, while recognized and studied since the early 1970's, has yet to be adequately resolved.

Water induction incidents have become of such concern that the ASME (American Society of Mechanical Engineers) established a Committee on Turbine Water- Damage Prevention; plant design recommendations to prevent water damage are contained in ANSI/ASME Standard No. TDP-1-1985. More recently, studies done by the assignee of the present invention for EPRI in actual operating power generating facilities are set forth in a final report prepared and released by EPRI as report CS-4285, "Detection of Water Induction in Steam Turbines. Phase III: Field Demonstration." These studies emphasize the continuing, critical need for reliable sensors and monitoring systems for use in the environment of steam turbines, to detect the severe problem of water induction.

SUMMARY OF THE INVENTION

Accordingly, there remains a critical need for improved instrumentation and monitoring systems employing differential temperature sensors for reliably detecting the potentially serious water induction problems in steam turbine installations, as well as for detecting a liquid/gas (vapor) condition and/or any change therein in other high pressure and high temperature environments such as those which exist in nuclear reactor vessels. Perhaps most critical to water induction monitor systems for use with steam turbines, is the fact that the sensors and associated control systems typically remain inactive for many years, before the system is called upon to generate a response indicating that a water induction event may take place. Over such extended time periods, however, it is predictable that periodic failure of the electrical elements, i.e., both the heater and the thermocouple elements, will occur, due to the vibration and cycling conditions to which they are exposed. It follows that the sensor device itself must be of rugged construction and sufficient mechanical strength so as to withstand, over essentially indefinite time periods, the high temperature and pressure conditions, and cycling thereof, as well as the vibrations to which it is subjected, while nevertheless affording highly accurate and reliable outputs. Because of the potential of failure of both the heating and the temperature sensing elements in such sensors, the sensors and the associated monitoring and control circuitry must afford on-line test capabilities, as well as the capability of on-line replacement of the heater and thermocouple elements of the sensors. Each sensor, moreover, should afford duplex, or redundant, components; likewise, the associated control and monitoring circuitry should produce automatic alarm indications upon detection of such failures, as well as automatic toggling or switching to the duplex or redundant elements upon detection of failures.

A closely related concern is that the number of penetrations through the sidewall of the vessel within which conditions are to be monitored, i.e., to accommodate the sensors, be minimized, from both structural integrity and installation efficiency standpoints. Further, taking into account the desired duplex capability, assuring accuracy of the sensor outputs dictates that substantially the same conditions be monitored by the respective, duplex elements of each sensor.

The differential temperature sensors as disclosed in the above, cross-referenced applications and incorporated in the instrumentation and monitoring systems of the present invention, overcome the foregoing and other problems and deficiencies of the prior art, and satisfy the objectives above-noted.

The sensors, or detectors, in accordance with various different disclosed embodiments thereof, uniformly are of rugged design and afford reliable and safe pressure vessel penetration—and a minimum number of such penetrations for a given level of accuracy and verified monitoring capability by the associated instrumentation system. The various disclosed embodiments accommodate the requisite heater and thermocouple elements to afford the desired differential temperature sensing, or detecting operation, along with on-line testability and on-line replaceability of those elements; moreover, in certain preferred sensor embodiments of duplex character, automatic substitution of failed elements may be performed by the associated instrumentation system, in actual operation. All share a basic, or generic structural configuration of a generally cylindrical thermowell body which is split by a small gap along a bilateral plane forming, effectively, two identical half-cylinder probes which are integrally joined to and extend from a common, cylindrical shank portion. In another embodiment, the body is split by a second bilateral plane, crossed, or transverse, relative to the first and thus defining four identical quarter-cylinder probes. Accordingly, the expression part-cylinder, generic to both, is adopted, where applicable. The shank portion is threaded on a section of its exterior circumference for being received and secured in a boss welded to a steam line or other pressure vessel; alternatively, a socket weld connection may be made. The part-cylinder probes thus project into the interior of the line, or may be recessed into a boss, and in either such installation, are in communication with the fluid condition in the line, or vessel, for performing the sensing/detecting function. Accordingly, the generic expression is adopted that the detector, or sensor, is mounted to a pressure vessel with the probes in communication with the fluid in the pressure vessel, the condition of which is to be monitored. The shank is bored from its upper, free end to define a generally cylindrical access chamber therein, terminating in a base wall at the juncture of the shank and the half-cylinder probes.

In accordance with a first preferred embodiment of the sensors, a central bore and a pair of bores symmetrically displaced relatively to the central bore extend in parallel-axial relationship into each half-cylinder probe from the base wall; within each half-cylinder probe, the heater element is inserted into the central bore and a pair of thermocouple sensor elements is inserted into the corresponding pair of symmetrically displaced bores. Thus, the sensor is of duplex configuration and functional capability, either probe being selectable as the heated probe/thermocouple and accordingly the heater element thereof being supplied with electrical power, and the other probe with the inactive heater element providing the nonheated thermocouple element, thereby to function as a differential temperature sensor. As will be more fully described in the following, the opposite complementary elements of the two probes may be selected in the alternative; this duplex configuration affords many advantages, including automatic switching or toggling between the complementary sets of heater elements for performing verification and fouling tests and for automatic substitution of complementary elements upon detection of element failure, thereby to afford continuous monitoring functions despite individual element failure.

By virtue of the connection of the shank to the pipe or vessel wall, the latter functions as a temperature sink affording thermal isolation between the heated and unheated half-cylinder probes, enhancing the accuracy of the thermocouple outputs. A connector box is affixed to the upper, free end of the shank for connecting the electrical leads of the heaters and the thermocouples through a cable to external monitoring, control and power circuits. The sensor design provides for securing the elements in their inserted positions, while permitting ready, on-line access to the heater and thermocouple elements for replacement, without any need for removing the thermowell housing.

Instrumentation and monitoring systems, as herein disclosed and claimed, perform continuity checks of both the heater and the associated pair of thermocouple elements of each sensor probe on a continuous basis, and provide suitable indications of failure of any of these elements. When a failed element is detected, the system automatically switches to the complementary set of elements, as is required to correct for and thus exclude the failed sensor and prevents false alarms that would otherwise result upon a component failure. More specifically, the sensor functions as a differential temperature sensor, as above explained. Thus, identifying the two half-cylinder probes as A and B, heater A may be initially energized. One of the symmetrically disposed thermocouples A1 and A2, for example A1, then is employed in conjunction with one of the thermocouples B1 and B2 of probe B, for example, thermocouple B1. Should either of thermocouples A1 and B1 fail, the system automatically switches to the respective, complementary thermocouples A2 and B2. Similarly, should heater A fail, the system automatically switches to heater B. As will be appreciated, the differential temperature indication ($\Delta T$) should be of the same value but opposite sign. The switching or toggling capability, afforded by the duplex character of the sensor, thus enables automatic correction for failed elements, without loss of continuous monitoring and without producing a false alarm. Moreover, the validity of testing operations is enhanced, since by toggling between heater A and heater B during on-line testing, and comparing the resulting, respective outputs, i.e., $\Delta T$ indications of equal value but opposite signs should be produced, the system can confirm that the sensor has not been fouled by accumulation of material the probes and that the calibration remains valid.

A second, integrated detector, or sensor, embodiment similarly employs a generally cylindrical thermowell body having two (or four) identical part-cylinder probes but only a single bore is formed in each of the probes. A single heater/thermometer element, effective to simultaneously heat and measure the temperature of the probe, is received in each bore. The heater/thermometer element is of nickel, iron or other similar, pure metal, having a value of electrical resistance which is substantially linearly dependent on temperature. As to each related pair of probes, the heater/thermometer element of one is supplied with sufficient current for heating its corresponding probe and the other with a much smaller current, the former functioning as the heated element, or probe, and the latter as the reference element, or probe. Conveniently, the two heater/thermometer elements are connected as corresponding arms of a bridge and predetermined, proportionately related currents are supplied thereto, the voltage drop across the heater/thermometer element of the reference probe being correspondingly multiplied by the same proportionality factor and the multiplied value being compared, in opposite sense, with the voltage drop across the heated element by a differential amplifier. The resultant differential voltage ($\Delta V$) thus obtained represents the value of the temperature differential ($\Delta T$) between the selected pair of probes (i.e., $\Delta T = k(\Delta V)$ where "k" is a known constant). Similarly to the first embodiment, a high level differential is maintained when the sensor probes are exposed to steam, and is substantially reduced when the probes are surrounded by water. This embodiment has a duplex character, permitting toggling, as above-described, for enhanced monitoring/testing operations.

In accordance with another embodiment of an integrated sensor, or detector, two bores are symmetrically disposed in each of the two half-cylinder probes and four such heater/thermometer elements are received in the respective bores. There thus are provided two pairs of heater and reference elements, each such pair comprising one element from each of the two half-cylinder probes. Preferably, the bores are formed in symmetrical relationship in the respective probes and the two sets of, effectively, diagonally-related elements are associated as the respective two pairs. This embodiment thus has a duplex character affording the switching or toggling capability above-described, thus enhancing the validity of the monitoring/testing operations and enabling automatic corrections/substitutions upon element failure.

In accordance with yet another embodiment of the integrated sensor, or detector, the cylindrical thermowell body is split by two small, crossed gaps along corresponding, crossed bilateral planes, the planes preferably being perpendicular and intersecting along the axis of the cylindrical thermowell body so as to define, effectively, four identical half-cylinder probes. This embodiment affords the same duplex character and the related switching or toggling capability as that just above described, and the further capabilities of parallel, independent operation, with "voting" as to the dual, monitored condition $\Delta T$ outputs. Relating the four elements as before, i.e., as two corresponding pairs, redundant, high temperature differential outputs from both pairs enhance the assurance of the detected condition indication of steam, i.e., no water; likewise, redundant low temperature differential outputs enhance the reliability of the detected condition of the presence of water. Conflicting high and low temperature differential output indications of the respective pairs in either sense, on the other hand, indicate a failed or possibly fouled sensor.

The integrated sensors, or detectors, in addition to affording expanded and more versatile detection functions in the successively more complex configurations, offer the added advantage of a reduction in size with concomitant reduction in the costs of manufacture and installation and, even more significantly, an improvement in thermal performance and mechanical strength.

Instrumentation and monitoring systems incorporating the integrated sensors perform functionally as the first system embodiment, discussed above, yet are of simplified internal organization and both simplified and reduced interconnecting wiring, contributing to further cost of manufacture and installation, and maintenance.

These and other features and advantages of instrumentation and monitoring systems incorporating such differential temperature sensors in accordance with the invention will become more apparent with reference to the following detailed description and drawings.

BRIEF DESCRIPTION OF THE DRAWINGS

FIG. 10 is a schematic, partially in block diagram form, of the instrumentation and monitoring system of FIG. 9;

DETAILED DESCRIPTION OF THE PREFERRED EMBODIMENT

Figure 1:
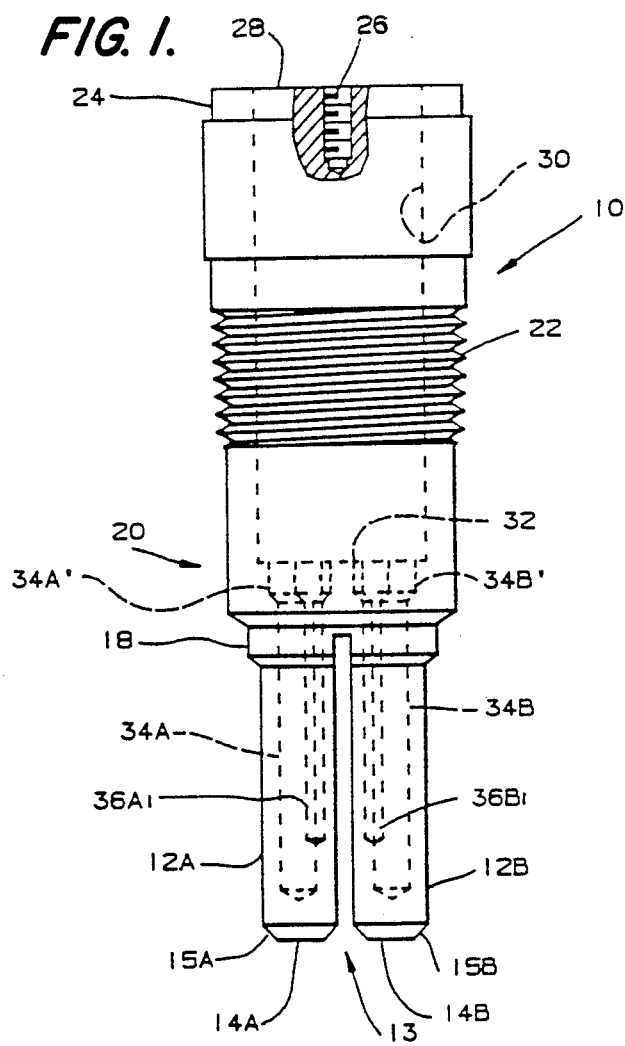
FIG. 1 is an elevational view of the split-well thermowell housing of a first sensor embodiment utilizable in a first instrumentation and monitoring system embodiment in accordance with the present invention.
Figure 2:
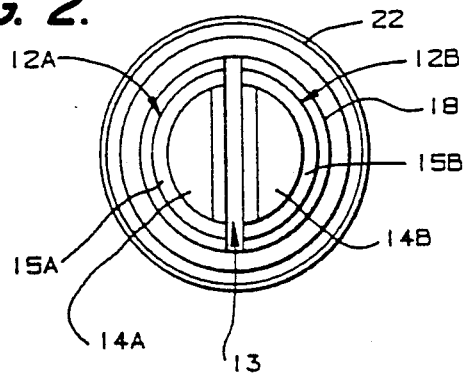
FIG. 2 is a bottom plan view of the split-well thermowell housing of FIG. 1.
Figure 3:
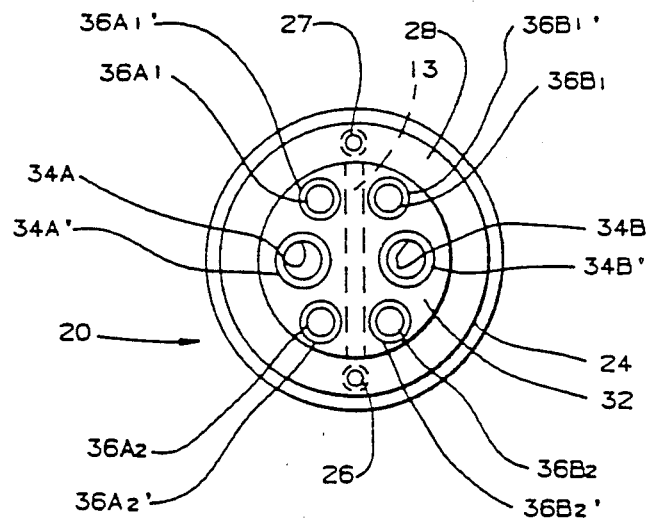
FIG. 3 is a top plan view of the split-well thermowell housing of FIG. 1.

FIG. 1 is an elevational view of the housing 10 of a first embodiment of a split-well thermowell sensor suitable for use in an instrumentation and monitoring system in accordance with the present invention and is described concurrently with reference to the bottom plan and top plan views thereof shown in FIGS. 2 and 3. The sensor housing 10 preferably is formed of a cylindrical bar of stainless steel or other, mechanically strong but poor heat-conducting metal, which is machined to the configuration illustrated in the drawings and herein described. One end of the bar is machined to define two identical, substantially half-cylinder sensor probes 12A and 12B delineated by a bilateral plane, identified at 13, which is cut therebetween. The ends, or tips, 14A and 14B of the probes 12A and 12B further are machined to define chambers 15A and 15B. The opposite ends, or bases, of the probes 12A and 12B thus extend integrally from a shank portion 20 of the sensor housing 10, a collar 18 of slightly larger diameter than the exterior circumference of the probes 12A and 12B is formed at approximately the juncture of the shank 20 and the probes 12A and 12B, for a purpose to be explained. A pipe thread is formed on section 22 of the shank 20, for mounting the housing 10 in a correspondingly threaded boss that is welded into the steam line, in a conventional manner. An annular mounting ledge 24 is formed on the outer surface of the upper, free end of the shank 20, and threaded holes 26 and 27 are formed in the annular end surface 28 of the shank 20, for purposes to be described.

Shank 20 is bored from its upper free end to define a generally cylindrical chamber 30 extending coaxially through a substantial portion of the length of the shank 20 and terminating in a base wall 32, adjacent the juncture of the base ends of the probes 12A and 12B. Central bores 34A and 34B extend in parallel axial relationship from the base wall 32 into the probes 12A and 12B, respectively, to a position closely adjacent the tips 14A and 14B thereof. The bores 34A and 34B are provided to accommodate generally elongated and cylindrical heater elements (not shown in FIGS. 1 to 3), as later described. Symmetrically disposed about the bores 34A and 34B are further bores 36A1, 36A2 and 36B1, 36B2, respectively, which extend approximately two-thirds of the axial length of the probes 12A and 12B, respectively, and which are provided for receiving corresponding thermocouple elements (not shown in FIGS. 1 to 3).

The overall axial length of the sensor housing 10 may be approximately six inches and the maximum diameter approximately two inches, the threaded portion 22 corresponding to a standard one and one-half inch pipe tap which is formed in the boss, for mounting the housing 10 as before described. The bilateral planar gap 13 separating the sensor probes 12A and 12B may be approximately one-eighth of an inch thick and the diameter of the outer circumference of the probes 12A and 12B may be approximately one and one-quarter inches. The bores 34a and 34B for the heater elements may be 0.257 inch diameter by 2.5 inch depth, measured from the base wall 32 and the bores 36A1, 36A2 and 36B1, 36B2 for the thermocouple elements may be 0.136 inch diameter and 2.00 inches deep. Each of these bores further is counterbored to a slightly larger diameter and about one-quarter of an inch in depth, as identified by identical, but primed numerals 34A′, 34B′, 36A1′ . . . 36B2′.

Figure 5:
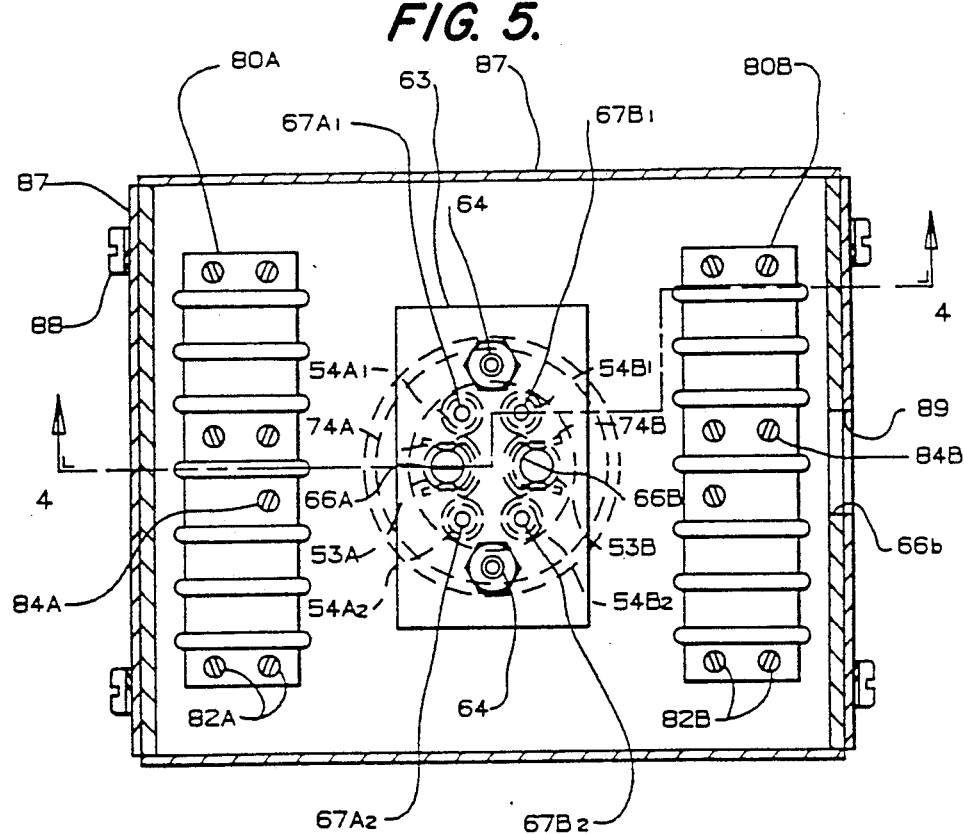
FIG. 5 is a top plan view, partially in cross-section, taken along a broken plane passing through the line 5—5 in FIG. 4.
Figure 4:
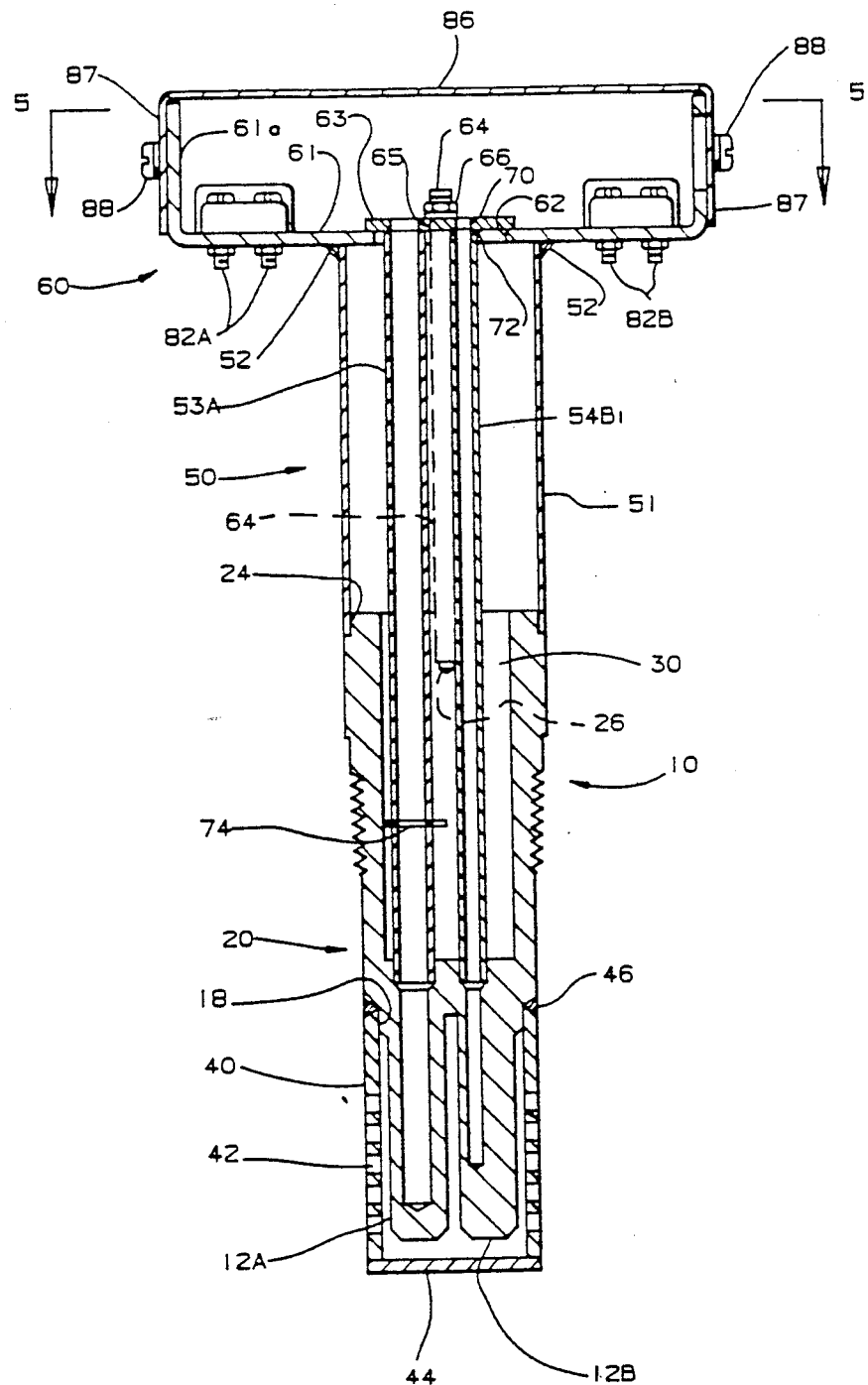
FIG. 4 is an elevational and cross-sectional view of the assembly of the sensor of the first embodiment, taken in a plane through the axis of the split-well thermowell housing as shown in FIG. 1, and further including an electrical connector box and related structures.

FIG. 4 is an elevational and cross-sectional view, taken in a broken plane along the line 4—4 in FIG. 5, of the sensor housing 10, illustrating the completed assembly of the sensor. A protective shield 40 having apertures 42 in its cylindrical sidewall 43 and, typically, a base 44, which may also contain apertures, is disposed about the sensor probes 12A and 12B and secured at its upper, free end at the collar 18 of the shank 20 of the sensor housing 10 by a weld bead 46. The primary function of the shield 40 is to reduce the velocity of the steam flow around the split wells, or probes, of the sensor and yet allow water to enter. A high steam flow velocity may cause the heated sensor probe to be cooled as effectively as water. Thus, the apertures 42 are arranged symmetrically in the shield 40 so as to permit a minimum or limited amount of flow in immediate contact with the sensor probes and thus within the sensor chamber defined within the interior of the shield 40, when the sensor is disposed in the steam flow path. Since the apertures 42, while symmetric relative to the probes 12A and 12B, are not necessarily uniformly disposed about the cylindrical sidewall 43 of the shield 40 and instead are aligned perpendicularly to the direction of flow, the sensor must be properly oriented with respect to the direction of steam flow, when installed. Holes may also be placed in the base of the shield.

Extension assembly 50 releasably mounts an electrical connector box 60 to the upper free end of the housing 10. The assembly 50 comprises a cylindrical sleeve 51 which is telescopingly received at its lower end in the annular ledge 24 of the housing 10 and is welded at its upper end to the base wall 61 of box 60, as indicated by weld bead 52. To better appreciate the illustration of FIG. 4, it is taken in a segmented plane along the line 4—4 in FIG. 5. The extension assembly 50 thus comprises two elongated tubes 53A and 53B which are received at their bottom ends, as seen in FIG. 4, in the counterbores 34A′ and 34B′ which accommodate the heater elements A and B (not shown) and extend at their upper ends to a position flush with the interior surface of base wall 61 of connector box 60. Similar, but smaller diameter tubes 54A1, 54A2 and 54B1, 54B2 are received at their lower ends in the corresponding counterbores 36A1′, 36A2′ and 36B1′, 36B2′ and similarly extend to the upper surface of the base wall 61 and connector box 60. The base wall 61 includes a central aperture 62 to accommodate the various tubes, just described.

Within the connector box 60, plate 63 is disposed over and spans aperture 62. Threaded rods 64 are received in the threaded bores 26 of the sensor housing 10 and are received through holes 65 in the plate 63, extending thereabove so as to receive nuts 66 for securing the plate 63 and, through it, the connector box 60 and extension assembly 50 to the sensor housing 10. Holes 66A and 66B are formed in the plate 63 for permitting passage therethrough of the electrical connections (not shown) to the heater elements; similarly, holes 67A1, 67A2 and 67B1, 67B2 are formed in the plate 63, corresponding to the four thermocouples to be received in the sensor housing 10. FIG. 4 illustrates an illustrative thermocouple 70, as received in and passing through plate 63, the upper end being broken-away. A true arc ring 72 is received about the upper end of the thermocouple 70 and engaged by the under surface of plate 63, thereby to secure the thermocouple 70 in position. Spring-type snap rings 74A and 74B are received through slots formed in the sidewall of the corresponding tubes 53A and 53B, which secure the heater elements (not shown in FIGS. 4 and 5) within the corresponding tubes 53A and 53B. Terminal strips 80A and 80B are secured on the base plate 61 by screws and nuts 82A and 82B; sufficient terminal screws 84A and 84B are provided on the respective strips 80A and 80B for connection to the leads from the respective thermocouples and heaters of the probes 12A and 12B—which will be understood to be six (6) in number, for each probe half.

Figure 6:
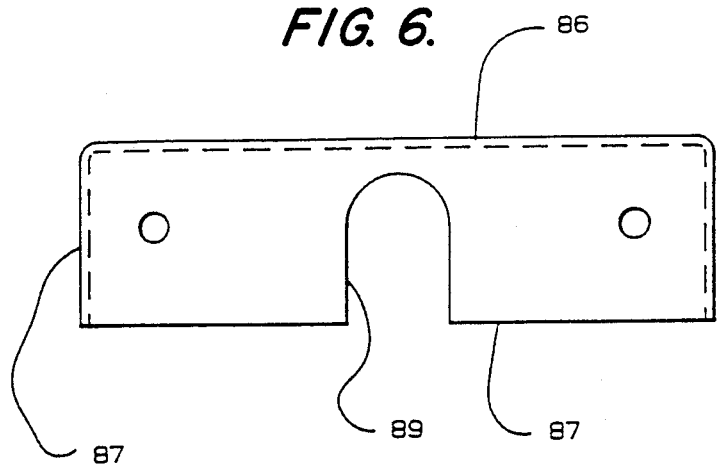
FIG. 6 is an end elevational view of a cover component of the connector box, shown in cross-section in FIGS. 4 and 5.

With concurrent reference to FIGS. 4, 5 and 6, a cover plate 86 has four (4) downwardly depending sides 87 and is received over the upturned ends 61a of the base plate 61 and secured in position by self-tapping screws 88. Mating openings 89 and 66b are provided to accommodate a cable (not shown) for connection to the connector screws 84A and 84B of the terminal strips 80A and 80B.

Figure 7:
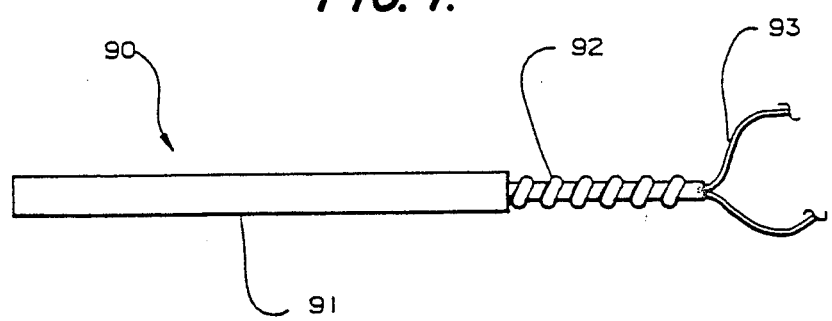
FIGS. 7 and 8 are plan views of heater and thermocouple components, respectively, utilized in the sensor of the first embodiment.

FIG. 7 is an illustration of a heater element 90 for use in the sensor of FIGS. 1 to 6. It comprises a generally cylindrical heater element portion 91 having a grooved tip portion 92 from which leads 93 extend. With reference to FIGS. 4 and 5, clip 74 is received in the groove portion 92 for securing the heater element 90 in position. A preferred heater element is of a commercially available type known as a FIREROD CARTRIDGE HEATER, manufactured by the Watlow Company of St. Louis, Missouri and identified by code E1A51; it is of one-quarter inch diameter and three inches in length, rated at 120 volts and 80 watts of power.

Figure 8:
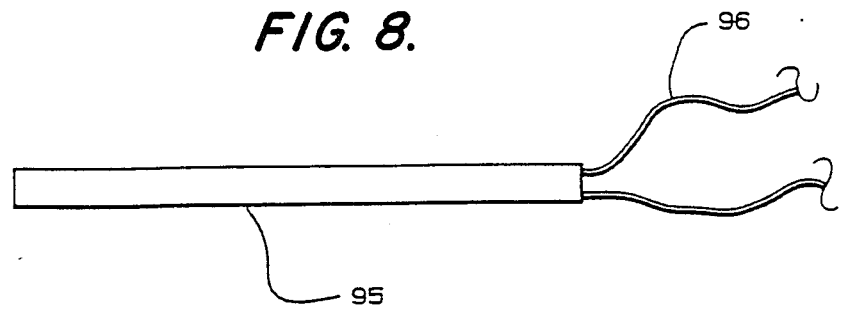

FIG. 8 illustrates a plan view of a thermocouple 95 as is contemplated for use in the sensor of FIGS. 1 to 6, having a generally elongated cylindrical body and leads 96. Commercially available thermocouples may be used, a preferred one being Model CAIN-18U-10RP manufactured by Marlin Manufacturing Company of Cleveland, Ohio. The structure is approximately 10 inches long which correspondingly is accommodated by the sensor housing 10 and extension assembly 50, as seen in the preceding FIGS. 4 and 5.

In addition to the rugged construction and low cost of manufacture and installation, the duplex character of the sensor 10 affords significant operational advantages as well as simplifying maintenance operations by on-line replacement of defective or failed elements. These aspects of the duplex sensor will be more readily appreciated by the following description, taken in relation to FIGS. 9, 10 and 11A to 11C, of a system and related circuitry utilizing the aforesaid sensors in accordance with the present invention.

Figure 9:
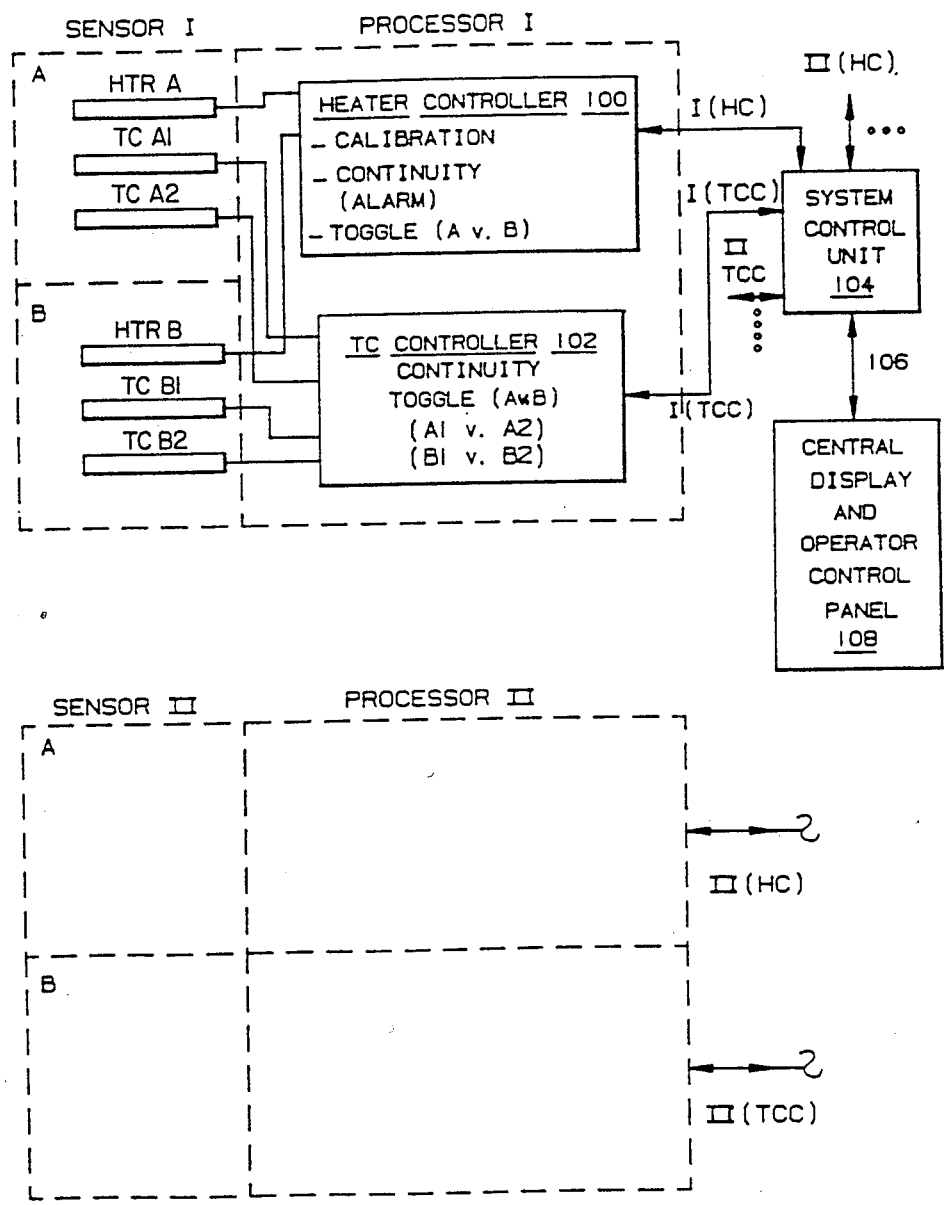
FIG. 9 is a schematic block diagram of an instrumentation and monitoring system employing multiple sensors of the split-well type of the first embodiment of the present invention.

FIG. 9 is a block diagram of a first embodiment of the instrumentation and monitoring systems of the present invention, as particularly designed for use with plural sensors of the type of FIGS. 1 through 8. In FIG. 9, two such sensors, designated sensor I and sensor II, are illustrated, it being understood that numerous sensors typically would be accommodated in the system. Since each sensor is of identical construction, the duplex, internal elements of the probes are schematically illustrated only for sensor I; consistent with the element number/letter designations in FIGS. 1 through 8, sensor I comprises the dual probes A and B respectively comprising heater (HTR) A and heater (HTR) B, and thermocouples (TC) A1, A2, and thermocouples (TC) B1, B2. In similar fashion, processor I for sensor I includes a heater controller 100 and a thermocouple (TC) controller 102, respectively interconnected through bidirectional buses I (HC) and I (TC) to a system control unit 104. Unit 104 further is connected over plural such buses II (HC), . . . and II (TC), . . . to corresponding controllers (HC and TC) of plural, respective processors II, . . . and associated sensors II, . . . , and over a bidirectional bus 106 to a central display and operator control panel 108. As more fully described hereafter, heater controller 100, under controls from system control unit 104, provides for calibration, on-line testing (e.g., continuity checking and shorts and grounds, processing of alarm indications, and toggling of heaters A and B of sensor I. Similarly, under control of the system control unit 104, the thermocouple (TC) controller 102 performs corresponding functions for the respective thermocouples A1 and A2, and B1 and B2, e.g., on-maintenance line testing and automatic switching functions upon element failure.

FIG. 10 is a schematic illustration, partially in block diagram form, of details of the components of the instrumentation and monitoring system of the invention for a single processor I (i.e., as in FIG. 9) including a heater controller 100 and a TC controller 102. As shown, interface circuits 118 and 129 in the controllers 100 and 102, respectively, interface between the internal components of the latter and the system control unit 104. Heater elements HTR A and HTR B are independently connected through a continuity check, current flow check, and calibration ("CCCFCC") unit 110 and through a switch, or toggle, selection circuit (SELECTOR) 112, to an adjustable power supply 116. Display unit 114 includes alarm lamps 116 and 118, respectively corresponding to the heater elements HTR A and HTR B, and which are respectively and independently illuminated when the corresponding heater element has failed, by corresponding outputs from the unit 110. The associated units 110 and 114, unit 112 and the adjustable DC supply unit 116 are connected through interface circuits 118 and appropriate buses, as shown, to a system control unit 104.

System control unit 104 automatically adjusts the output of the DC supply unit 116 in accordance with conditions determined by the CCCFCC unit 110 and further in accordance with the selection of heater element HTR A or HTR B, as affected by operation of selector 112 by the system control unit 104, to assure that identical heat outputs are produced by heaters A and B. Unit 104 also produces a heater failure display on central display panel 108, as later described.

The illustrative sensor of FIG. 10 includes four thermocouples TC A1, TC A2, TC B1 and TC B2; in conventional fashion for a differential temperature sensor, one thermocouple of probe A is associated with a corresponding thermocouple of probe B and the two are connected in series as a pair and in a bucking, or opposed, relationship. Thermocouple elements TC A1 and TC B 1 are connected as a first pair and the thermocouple elements TC A2 and TC B2 are connected as a second, or complementary, such pair in the described series, bucking or opposed relationship. In FIG. 10, the two such pairs are designated TCP-1 and TCP-2. Continuity check unit 121 checks the continuity of the respective pairs of thermocouples on an on-going basis and, should lack of continuity indicating an element failure be detected, provides an output to TC failure alarm unit 120 for lighting the corresponding alarm lamp 120-1 or 120-2 corresponding to the respective, failed thermocouple pair TCP-1 or TCP-2, and to system control unit 104 for producing a failure display on central display panel 108, as later described.

Selector unit 122 is controlled to select the outputs of one or the other of the two TC TEMP CIRCUITS 124-1 and 124-2 to supply the selected one of said respective outputs $\Delta T1$ and $\Delta T2$ to the interface circuits 129. The selected one of the TC TEMP CIRCUITS 124-1 and 124-2 produces an output voltage signal STEMP proportional to the temperature differential ($\Delta T$) sensed by the selected thermocouple pair. Interface circuits 129 interconnect the units 120, 121, 122, 124-1 and 124-2 with the system control unit 104 through appropriate buses, as indicated. Unit 104 also produces a selectable $\Delta T$ display on central display unit 108 during normal monitoring, displays of a failed sensor and failed heater/thermocouple pair, and an automatic and verified indication of an alarm condition for each sensor on the control display panel 108.

Figure 11A:
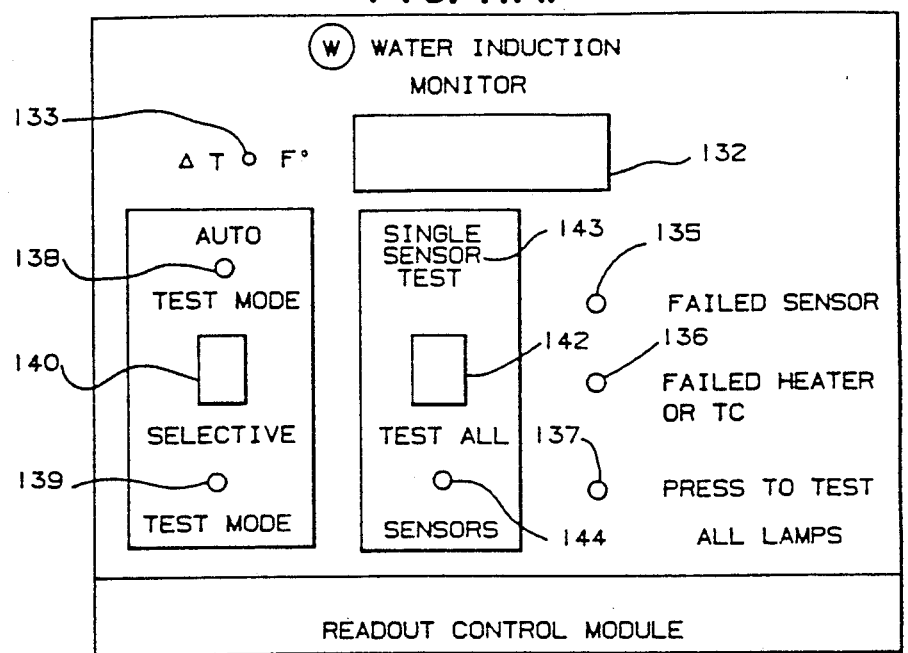
FIGS. 11A, 11B, and 11C are plan views of components of a display and operator/control panel of a first instrumentation and monitoring system embodiment in accordance with the present invention.
Figure 11B:
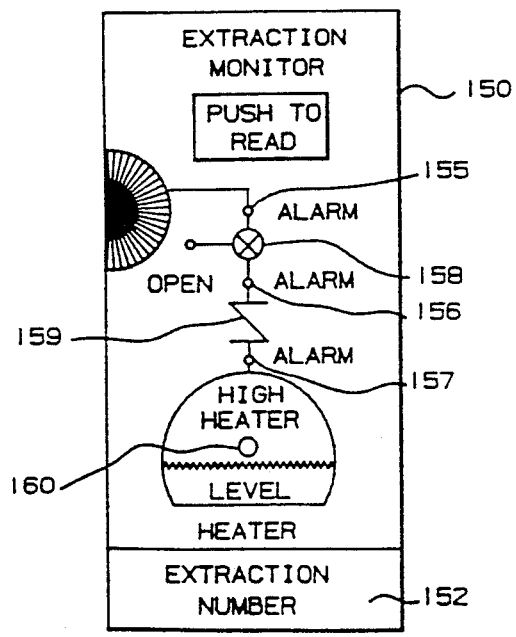
Figure 11C:
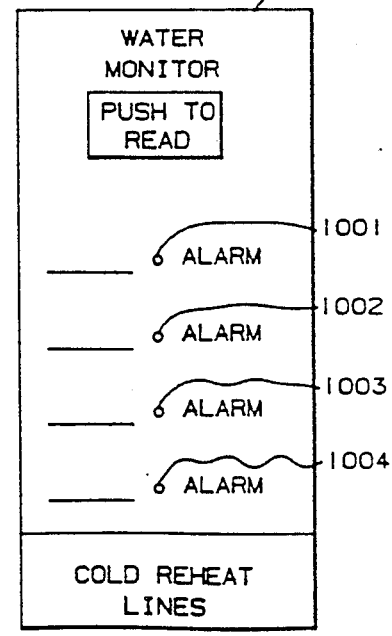

FIGS. 11A, 11B and 11C illustrate panel configurations of various display and control modules of the display and operator control panel 108 of FIGS. 9 and 10. Readout and control module 130 of FIG. 11A includes a digital display 132 for indicating the value and sign of the temperature differential $\Delta T$ (in Fahrenheit degrees) currently measured by a given sensor, selected for display as hereinafter described.

Under operator control of switch 140, the system may be placed in an automatic test mode, evidenced by lighting of lamp 138 or in a selective test mode, evidenced by lighting of lamp 139; in the latter mode, the operator may select a selected one of the plural sensors, again, as more fully hereinafter described. Momentary actuation of switch 142 produces a "Test All Sensors" or "Single Sensor Test" mode of operation, later described. The digital display 132 is enabled only by the operator for producing a display of the $\Delta T$ for a selected sensor. Finally, a "failed sensor" lamp 135 and a "failed heater or TC (thermocouple) lamp" 136 are provided to give corresponding alarms, described in more detail hereafter. Finally, switch 137 may be depressed for testing all display lamps in the system.

FIG. 11B illustrates an extraction monitor 150; numerous such monitors are employed in a typical turbine system and thus plate 152 is provided to identify the particular, monitored function and thus the location of the associated sensors. As illustrated in the schematic on the monitor panel 150, sensors are positioned in the extraction piping and heater associated with a turbine at the positions of the corresponding alarm lamps/switches 155, 156, 157 and 160. Particularly, alarm lamp/switch 155 corresponds to a sensor positioned at the turbine side of an isolation valve 158; alarm lamp/switch 156, to a sensor positioned between the isolation valve 158 and a nonreturn valve 159; alarm lamp/switch 157, to a sensor positioned at a low point in the extraction line; and alarm lamp/switch 160, to a sensor positioned in the heater for detecting a high water level condition in the heater. When water is detected by a given sensor, the corresponding alarm lamp/switch on panel 150 is automatically illuminated.

A number of different types of monitors may be incorporated in the system and corresponding monitor display and control panels incorporating similar alarm lamps/switches are provided therefore, as for monitor panel 150. Illustrative thereof is a water monitor panel 170 shown in FIG. 11C, having alarm lamps/switches 1001 through 1004. It thus is to be understood that the invention encompasses monitors of various, different types and of a sufficient number of each type, with corresponding monitor display and control panels, as required. For convenience, reference hereafter shall be limited to the extraction monitor panel 150 of FIG. 12B, as exemplary of all such panels.

The duplex character of the sensors enables significant system operations facilitating more meaningful monitoring and verification capabilities. With reference to the schematic presentation of sensor I in FIG. 10, assume that selector 112 normally selects heater HTR A and selector 122 normally selects thermocouple pair TCP-1 comprising the thermocouples TC A1 and TC B1. Under normal operating conditions (and thus in the absence of water surrounding the dual probes A and B of sensor I), TC A1 will be heated by HTR A and sense a higher temperature, relatively to that sensed by TC B1 and, for an assumed polarity or sense in which the respective outputs are paired, an output STEMP of a positive $\Delta T$ is produced. Conversely, if complementary heater B were selected and energized and thus substituted for heater A, under this same analysis, the STEMP output would be a negative $\Delta T$, i.e., the same numerical or absolute temperature differential value, but of opposite sign. As will be appreciated and as above-noted, the calibration circuit of unit 110, under direction of system control unit 104 and through adjustment thereby of the adjustable DC supply 116, provides for controlling the respective power levels supplied to heater A and to heater B, to assure that the same heater power is developed in HTR A and HTR B, resulting in the same absolute values of $\Delta T$ being produced if the sensor is not fouled.

The system further uses the capability of the duplex sensor by automatically toggling, or switching, between heater A and heater B for substituting heater B for heater A upon failure of heater A (or vice versa), so as to provide continuous monitoring functions and so as to prevent false alarm that would otherwise result from a heater failure. For example, if heater A fails, unit 104 will operate through selector 112 to switch to heater B.

With reference to the TC controller 102 in FIG. 10, the duplex nature of the sensor also affords significant capabilities in the system encompassing the thermocouples, as well. Thus, if one or both of the thermocouple elements of pair TCP-1 should fail, as detected by continuity check circuit 121, system control unit 104 causes selector 122 to switch automatically to the second pair TCP-2, for supplying the output through TC TEMP circuit 124-2 and thus deriving the value STEMP ($\Delta T$) therefrom. As shown in FIG. 10, TC A2 and TC B2 of the pair TCP-2 are connected in the same sense as the complementary, first pair TCP-1 of thermocouples TC A1 and TC B1. Thus, the same effective sign of $\Delta T$ is produced upon the alternative selection of the complementary pair TCP-2 of heater elements HTR A and HTR B. It will be appreciated that a more complex, or sophisticated, arrangement with greater failure indicating capabilities could be achieved by reversing the sense of TC A2 and TC B2, and thus of the pair TCP-2 relative to the pair TCP-1. Thus, for example, when using a given heater, e.g., HTR A, if a first pair TCP-1 fails and the system automatically switches to a second pair TCP-2, and the sensor is otherwise operative, there results a negative $\Delta T$, i.e., a temperature differential output of the same numeric value but opposite sign. This then would indicate which thermocouple pair had failed, facilitating maintenance operations.

Physical replacement (i.e., as distinguished from automatic substitution) of the heater elements and of the thermocouple elements of the sensor may be made on-line, following specific identification of the failed element at the processor I which may be located remotely from the central panel 108. Thus, HTR and TC failure alarm displays 114 and 120 are shown as incorporated in the heater controller 100 and TC controller 102, respectively, it being understood that the displays 114 and 120 would be positioned at a convenient location for viewing by maintenance personnel. In the event that a failed element is detected, the corresponding alarm lamp/switch 116 or 118 for heater A or heater B, or alarm lamp/switch 120-1 or 120-2 for the thermocouple pairs TCP-1 and TCP-2, respectively, is illuminated.

Should both heaters, A and B, and/or both thermocouple pairs, TCP-1 and TCP-2, fail, that sensor channel is disabled so as to prevent a false alarm. Further, an in-phase blinking of lamp/switch 135 (FIG. 11A) and the alarm lamp/switch for the failed channel informs the user that this channel has failed and has been disabled. Automatic toggling is performed for verification of a sensed alarm condition. Specifically, should the water level rise and surround both probes A and B, the normal $\Delta T$ value will be reduced significantly to less than an alarm threshold value, but typically to a non-zero value. The alarm condition is automatically verifiable, therefore, by toggling to heaters and comparing the corresponding $\Delta T$ value of STEMP. If not of the same numerical value (but of opposite sign), the conclusion may be reached that sensor I has been fouled and that the reduced $\Delta T$ value is a false alarm. On the other hand, the failure of the sensor to pass the verification test, as thus conducted, serves to alert the operator to the need for system maintenance.

With the foregoing background, the system operation, as displayed at and controlled from the central display and operator control panel 108, will be now more readily understood.

Considering first a normal operating condition, and in either of the "auto" and "selective" test modes, an operator may determine the $\Delta T$ of each sensor in the system by depressing the corresponding alarm lamp/switch, e.g., alarm lamp/switch 155 in the monitor panel 150. A time delay circuit, triggered by actuation of the alarm lamp/switch, e.g. 155, maintains the $\Delta T$ display in display 132 of module 130 for a predetermined time interval, e.g., two minutes. The time delay circuit is reset upon actuation of a further alarm lamp/switch, e.g., 156, in monitor panel 150 or in any other monitor panel.

These same alarm lamps/switches, as previously noted, are illuminated in the event that an alarm condition is sensed by the corresponding sensor. As likewise before noted, the system, in the automatic test mode as selected by switch 140, performs an automatic verification test on the sensor channel issuing an alarm condition by toggling of the heaters, before producing the alarm indication; the toggling function for verification, however, is disabled as to any sensor in which one of its heaters has already failed. The toggling function, in fact, is performed in each of three different formats, one in the "auto-test" mode and two in manual, or operator-controlled test modes, as now described.

Particularly, with switch 140 set to the auto-test mode position and thereby illuminating lamp/switch 138, system control unit 104 responds to an alarm condition as detected by a given sensor to perform the toggle function as a verification test on that sensor (unless, as before noted, the toggle test is inhibited by a heater failure in that sensor channel, in which event an alarm is issued based solely on the single functioning heater of the sensor). In the event that the same, but opposite sign, values of $\Delta T$ (and thus the absolute values of both being below the alarm threshold) are produced, an alarm is issued. If the two $\Delta T$ magnitudes disagree by more than a preset value, e.g., 3° F., a failed sensor alarm is issued as described above. This alarm is cleared by switching switch 140 to the central neutral position or to the Selective Test Mode (139). In a preferred embodiment of the system, in the "auto-test mode," the toggle test is performed only for sensor channels indicating an alarm, for verification thereof on the basis specified; further, only one cycle of the toggle test is performed in the auto-test mode in response to an alarm indication. Moreover, upon returning from either of the neutral or the "selective test mode" positions of switch 140 to the "auto-test mode" position, any channel currently indicating an alarm will undergo the toggle test before the alarm is reissued.

The second format of the toggle test is selectable by the operator, by placing switch 140 to the "selective test mode" position (thereby illuminating lamp/switch 139), and then simultaneously, momentarily depressing switch 142 to the Single Sensor Test position (143) and the alarm lamp/switch for the desired channel, e.g., alarm lamp/switch 155 in monitor panel 150. The $\Delta T$ for the toggled sensor then is displayed in panel 132 of monitor 130. As before explained, a time delay circuit maintains this display for two minutes, or until another switch prompting a display is pushed.

The toggle test, in the third format, is performed on all channels simultaneously by placing switch 140 in the 139 position and momentarily depressing switch 142 to the "test all sensors" position (illuminating lamp/switch 144). This switches all sensors from heater A to heater B (or, conversely, from B to A in the event of an opposite initial orientation). After a two minute period, the operator then manually depresses the alarm lamp/switches in individual succession (e.g., 155, 156, 157 ... as in monitor panel 150) to produce the corresponding succession of $\Delta T$ displays on display panel 132 of module 130. The resulting $\Delta T$ displays for the succession of sensor channels may be compared with previously recorded $\Delta T$ values of those same channels before all heaters were switched.

In either of these manual test modes, the operator may then verify the existence of an actual alarm condition, i.e., the $\Delta T$ displays are of the absolute same value (but opposite sign) which is below a predetermined threshold, or of fouling of the sensor, i.e., $\Delta T$ displays of different numerical values for the toggled positions.

The manual formats of the toggle test provide other operability checks, as well. For example, as before noted, in the event that one heater of a given sensor (e.g., sensor I) has failed, the toggle test is inhibited and no change in $\Delta T$ is observed in either of the manual test nodes. This will identify sensors with a single failed heater. Specific failed heater and thermocouple pair failures can be identified by lamps/switches on displays 114 and 120, respectively.

A failed sensor is identified by a blinking illumination of both the failed sensor lamp/switch 135 and the corresponding alarm lamp/switch for that sensor channel, e.g., alarm lamp/switch 155 of control panel 150. The failed sensor indication is produced by unit 104 as a result of any of (1) the loss of continuity in both thermocouple pairs TCP-1 and TCP-2 of a given sensor as detected by unit 121; (2) failure of both heater elements A and B of a given sensor as detected by unit 110; and (3) failure of a sensor to pass the toggle test in the "auto-test mode," as above-described.

Finally, button 137 on the module 130 may be depressed to test all lamps and lamp/switches of the central display and operator control panel 108 (FIG. 10) and thus including the specific indicator, alarm lamps and lamp/switches of the individual modules, e.g., 130, 152, 170 (FIGS. 11A–11C).

Figure 12A:
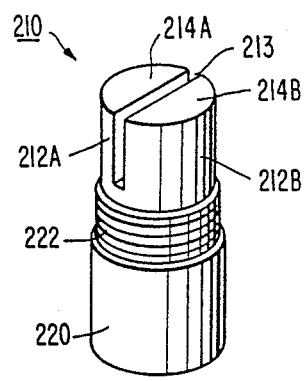
FIG. 12A is a simplified, perspective view of a split-well thermowell housing which, in more detail, may be substantially similar to that of FIG. 1 but has differing internal configurations in accordance with second and third sensor embodiments.

FIG. 12A is a perspective view of a split-well thermowell housing 210 representing the external configuration of both second and third sensor embodiments, the latter being differentiated by their respective internal configurations, as will be described. The external configuration of the sensor 210 may be substantially identical to the housing 10 of the FIG. 1, but because of the integrated feature, to be described, may be substantially smaller in size and thus have reduced heater power requirements; moreover, the integrated character reduces the number of heating and sensing elements, with concomitant savings in material, reduced electronic circuit complexity and reduced costs of manufacture and installation. For example, whereas the sensor housing 10 of FIG. 1 may be implemented for use as a one and one-half inch (1½') nipple pipe thread size, the sensor housing 210 instead may be constructed for use as a one inch (1') nipple pipe thread size device.

Similarly to housing 10 of FIG. 1, the housing 210 of FIG. 12A includes a pair of substantially half-cylinder probes 212A and 212B separated by a gap 213 defined by a bilateral plane symmetrical with respect to the axis of the housing 210. It will be understood that the housing 210, similarly to that of FIG. 1, comprises a shank portion 220 having a pipe thread 222 formed thereon or other alternative means for mounting the housing 210 through a suitable boss in a pipe or other pressure vessel. The shank 220 furthermore is bored to define a generally cylindrical chamber therewithin (not shown in FIG. 12A) substantially corresponding to the chamber 30 with base wall 32 in the housing 10 of FIG. 1.

Figure 12B:
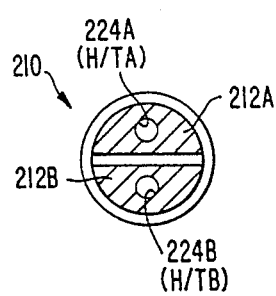
FIG. 12B is a cross-sectional view of the probe portion of the sensor housing of FIG. 12A, taken in a plane transverse to the central axis thereof, and illustrating the internal configuration thereof in accordance with a second sensor embodiment.

FIG. 12B is a cross-sectional view taken in a plane perpendicular to the axis of the housing 210 through the probes 212A and 212B, for illustrating bores 224A and 224B disposed centrally and generally symmetrically within the respective probes 212A and 212B and extending in parallel axial relationship therethrough to positions adjacent the free ends 214A and 214B of the respective probes. In accordance with this embodiment of the invention, an integrated heater/thermometer element having a outward appearance and external dimensions which may be substantially identical to the heater element 95 of FIG. 8 is received in each of the bores 224A and 224B; the latter, correspondingly, may be of 0.257 inch diameter and 2.5 inch depth, as for the sensor 10 of FIG. 1. Such heater elements are not illustrated in FIG. 12B, but their locations are designated by the parenthetical expressions H/T A and H/T B adjacent the respective bores 224A and 224B The elements H/T A and H/T B comprise heater elements of nickel, iron or other similar pure metal which exhibits a substantially linear relationship, or dependence, of electrical resistance to temperature. As explained hereinafter with reference to FIGS. 14 through 16, one of the elements, for example, H/T A, is supplied with current of a sufficient level to function as a heater and simultaneously as a thermometer and thus as the heated element; the other element, H/T B in the example, is supplied with a much lower current so as to render it negligible in effect as a heater element but to function nevertheless as a thermometer and thus as the reference element. Correspondingly, for the example, probe 212A is the heated probe and probe 212B is the reference probe. As will be understood from the description of the first embodiment of the invention, the alternative presence of steam or water will result in respective, high and low temperature differentials being produced as the output of the specified sensor element pair, as later discussed.

Figure 12C:
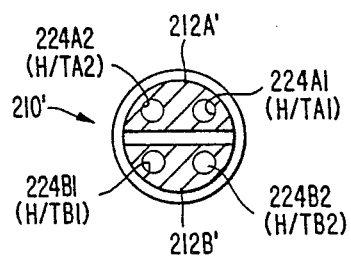
FIG. 12C is a cross-sectional view of the probe portion of the sensor housing of FIG. 12A, taken in a plane transverse to the central axis thereof, and illustrating the internal configuration thereof in accordance with a third sensor embodiment.

FIG. 12C is a cross-sectional view taken in a plane transverse to the axis of housing 210 through the probes 212A and 212B, but wherein the internal configuration of the housing 210 is altered in accordance with a third embodiment of the invention so as to include four identical bores, bores 224A1 and 224A2 being disposed in probe 212A' and bores 224B1 and 224B2 being disposed in probe 212B', the bores each being of identical dimensions, as above, and spaced in symmetrical and equidistant relationship from the sidewalls of the respective probes 212A' and 212B'. Four heater/thermometer H/T (elements A1, A2, B1 and B2 are received in the correspondingly designated bores. The embodiment of FIG. 12C affords the full duplex capabilities of the sensor 10 of the first embodiment of the invention disclosed in FIGS. 1 through 8 and thus may be employed in lieu thereof in the system as disclosed and discussed above in relation to FIGS. 9 to 11C, with modifications thereto as required to accommodate the integrated heater/thermometer character of the H/T elements. A system specifically designed to utilize the integrated sensor of FIG. 12C (and of a fourth embodiment, described hereinafter) moreover is disclosed in FIGS. 17 to 18, discussed hereafter.

Figure 13A:
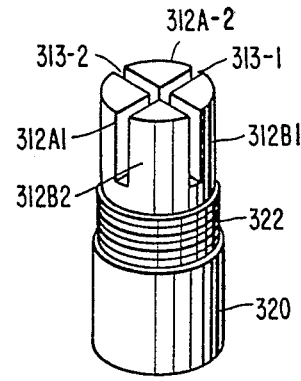
FIG. 13A is a simplified perspective view of a thermowell housing in accordance with a fourth sensor embodiment having four symmetrical part-cylinder probes defined by crossed bilateral planes.

FIG. 13A is a perspective view of a sensor housing 310 of a fourth embodiment, substantially corresponding to the housing 210 of FIG. 12A but having four part-cylinder (i.e., four symmetrical, substantially quarter-cylinder) probes 312A1 through 312B2, spaced by intersecting gaps 313-1 and 313-2 defined by crossed bilateral planes of mutually perpendicular relationship and symmetric with the axis of the housing 310. As seen in the cross-sectional view of FIG. 13B and adopting similar nomenclature as in FIG. 12C, bores 324A1 and 324A2 are formed in the respective probes 312A1 and 312A2, and bores 324B1 and 324B2 are formed in the respective probes 312B1 and 312B2, corresponding in respective heater/thermometer elements being received in the respective bores. The sensor employing the housing 310 permits operation of the respective diagonally related pairs of heater/thermometer elements (i.e., the pair H/T A1 and H/T B1, and the pair H/T A2 and H/T B2) as two fully independent, differential temperature sensors.

The sensors of FIGS. 12A to 13B furthermore may be provided with an electrical connector box and related structures substantially as disclosed for the first embodiment, but of simplified construction in view of the reduced number of electrical elements and related circuit connections required thereby.

Figure 13B:
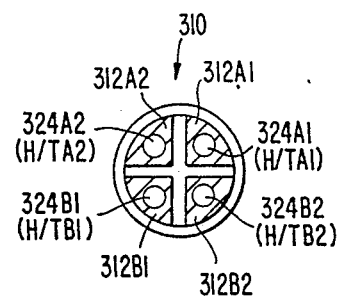
FIG. 13B is a cross-sectional view of the probes of the thermowell housing of FIG. 13A, taken in a plane transverse to the central axis of the latter.
Figure 14:
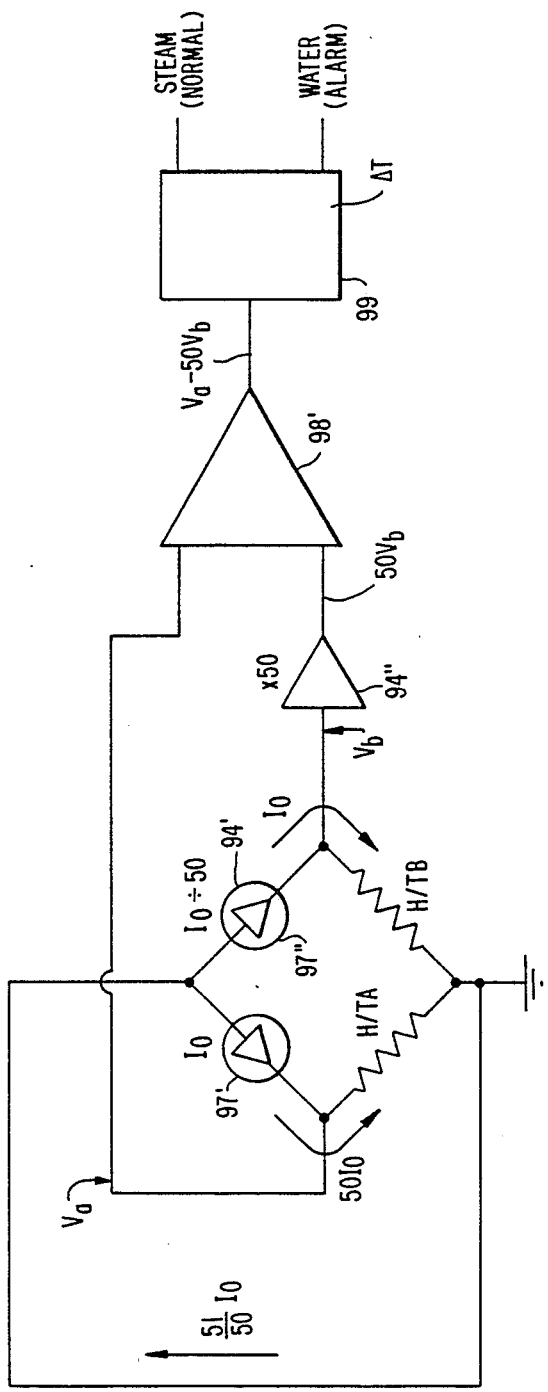
FIG. 14 is a simplified schematic of the current supplies/ and bridge circuit arrangement for both energizing and detecting a differential voltage, or voltage difference, representative of the differential between the temperatures sensed by the heater/thermometer elements associated as a pair in the integrated sensors of the embodiments of the invention shown variously in FIGS. 12A through 13B.

FIG. 14 is a simplified schematic of a circuit for both energizing a selected one of a related pair of heater/thermometer (H/T) elements A and B and for deriving from the respective voltage outputs thereof a differential voltage representative of the differential temperature sensed thereby; while illustrated for a single pair of related elements H/T A and H/T B such as employed in the housing 210 when internally configured as FIG. 11B, it will be understood that each of the diagonally related H/T element pairs, in each of the configurations of FIGS. 12C and 13B, would be similarly connected. Further, whereas a single such related H/T pair in the configuration of FIG. 12C would be selected at a time for such circuit connection and operation, both such pairs in the configuration of FIG. 13B may be so connected in respective such circuits for performing simultaneous sensing operations.

Figure 15:
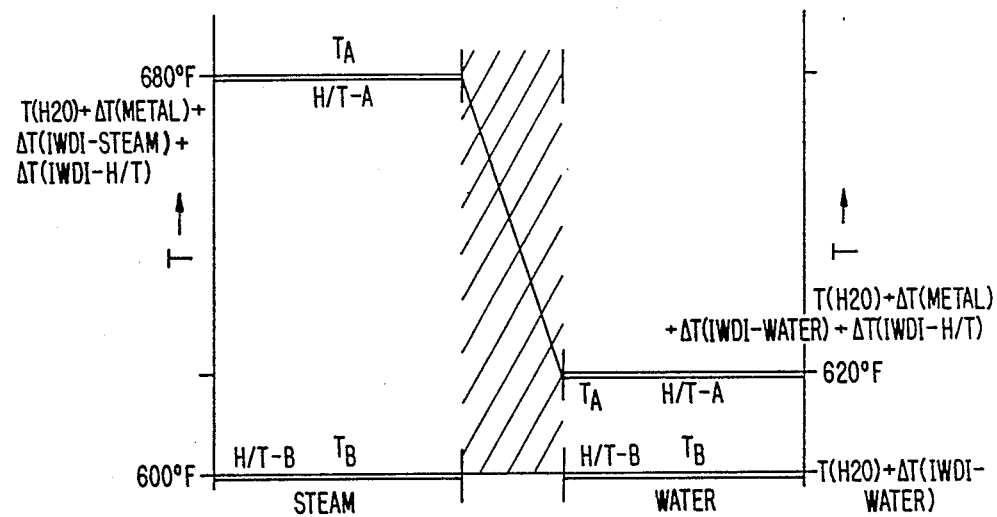
FIG. 15, is a temperature diagram used for explaining the temperature levels sensed by, and the corresponding differential produced by an associated pair of heater/thermometer elements in accordance with, the integrated sensor embodiments.

The operation of the circuit of FIG. 13 will now be discussed with reference to FIGS. 14 and 15. In FIG. 13, constant current sources 97' and 94' respectively supplying currents $I_0$ and $I_0 \div 50$ are connected in respective first and second legs of a bridge circuit in series with corresponding elements H/T A and H/T B, the two legs being interconnected in parallel at the vertically related, first set of diagonally opposite junctions. The external circuit between those junctions accordingly carries the current $51/50\ I_0$. The voltage outputs $V_a$ and $V_b$ at the horizontal, second set of diagonally opposite junctions are supplied to the inputs of differential amplifier 98', the voltage $V_b$ first being multiplied by a proportionality factor ("×50") by circuit 94". The proportionality factor is the inverse of the current differential supplied through the two legs by the sources 97' and 94' so as to enable comparison of the voltage outputs $V_a$ and $V_b$, circuit 94" accordingly producing the output $50V_b$ supplied to the second input of the differential amplifier 98'. The differential voltage output of the differential amplifier 98', $\Delta V = V_a - 50V_b$, thus is representative of the temperature differential between the temperatures sensed by the elements H/T A and H/T B, i.e., $\Delta T = k(\Delta V)$. The $\Delta V$ output from differential amplifier 98' is applied to a trigger and alarm circuit 99 which produces outputs indicating the sensed condition of steam (normal) or water (alarm), and which may be the respective, actual $\Delta T$ values.

Because of the complementary functions of circuits 94' and 94", the temperature sensing function of heater element H/T B is equivalent to that of element H/T A, but whereas H/T A functions additionally as the heated element, substantially no heating, i.e., insignificant heating, of H/T B occurs and the latter thus serves as the reference element.

The thermal function of an H/T element pair of the integrated sensors 210 and 310 is explained using the following definitions of temperature and differential temperatures:

| | |
|---|---|
| T(H₂O) | temperature of the steam or water within the pipe or vessel. |
| ΔT(IWDI-STEAM) | temperature drop between the outer surface of the probes |

| | |
|---|---|
| | 212A and 212B and steam. This is typically 60° F. |
| ΔT(IWDI-WATER) | temperature drop between the outer surface of the probes 212A and 212B and water. This is typically 0° F. |
| ΔT(METAL) | temperature drop across the metal surrounding the bore (e.g., 224A) of the heated probe (212A). This is small and is assumed to be zero. |
| ΔT(IWDI-H/T) | temperature drop across the (air) gap between the inner surface of the bore 224A in the probe 212A and the heated element, H/T A, typically 20° F. |

The changes in the respective, sensed temperatures of H/T A and H/T B ($T_a$ and $T_b$) in steam and water are shown in FIG. 14. The differential amplifier 98' shown in FIG. 13 subtracts out $T(H_2O)$ which is common to H/T A and H/T B. ΔT(IWDI−H/T) depends solely on the power dissipated in H/T A for bore H/T gaps ≦ 10 mils. Since power level supplied to H/T A (i.e., current $I_0$) and that supplied to H/T B (i.e., current $I_0 \div 50$) are held nearly constant by the respective sources 97' and 94', ΔT(IWDI−H/T) remains nearly constant.

The temperature of H/T A in steam is then:

$$T_A = T(H_2O)) + \Delta T(IWDI-STEAM) + \Delta T(IWDI-H/T) \quad (1)$$

In water, $T_A$ falls to:

$$T_A = T(H_2O) + \Delta T(IWDI-H/T) \quad (2)$$

The temperature of H/T B remains:

$$T_B = T(H_2O) \quad (3)$$

in steam and in water. The differential temperature is thus:

$$\Delta T = T_a - T_b = k(V_a - 50V_b) = \Delta T(IWDI-STEAM) + \Delta T(IWDI-H/T) \quad (4)$$

in steam; and $$\Delta T = T(IWDI-H/T) \quad (5)$$

in water. This represents a change in ΔT of, typically, ΔT=80° F. in steam to ΔT=20° F. in water.

Figure 16:
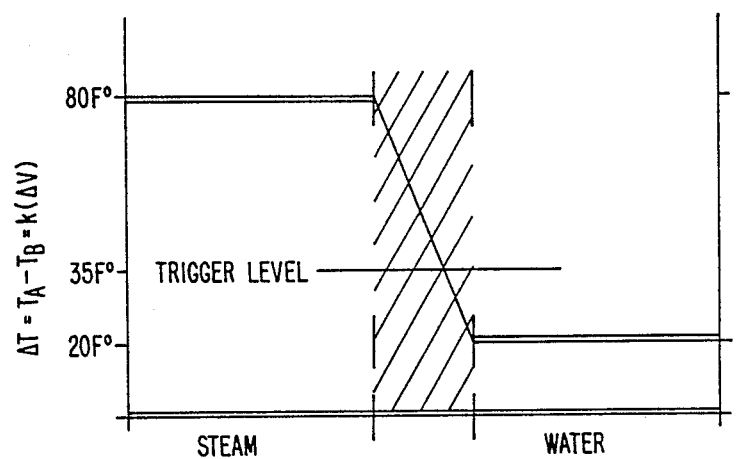
FIG. 16 is a temperature diagram illustrating the basis for setting a trigger level for delineating between the differential voltage outputs of the circuit of FIG. 14, respectively representative of an indication of steam and water.

FIG. 16 is a temperature diagram indicating the above, typical values of the temperature differentials ΔT of 80° F. in the case of steam and 20° F. in the case of water being present and sensed and, particularly, graphically illustrating the typical, 60° F. variation in those respective differential temperatures. FIG. 16 moreover illustrates a trigger level value of ΔT=35° F., a drop of somewhat less than the temperature range between the respective steam- and water-temperature differential values, for rendering a determination of the alarm condition that water is present. As implemented in FIG. 14, the trigger and alarm circuit 99 may utilize a voltage threshold value corresponding to ΔT=35° F. as a trigger level for automatically delineating between and providing, as an output, either a steam (normal) condition indication or a water (alarm) condition indication.

The sensor 310 of FIGS. 13A and 13B has the same functional capabilities as that of FIG. 12C and that of FIGS. 1-8 and thus may function as a full duplex sensor as described in relation to FIGS. 1-8. In fact, because the sensor 310 additionally has the capability of functioning as two independent temperature differential sensors, it may provide, by a logical combination of the respective temperature differential indications of the two independent H/T element pairs, a "voting" function as to the condition detected, thus affording a self-verification capability. Adopting, for simplicity, solely the designations A1, A2, B1, and B2 for the four H/T elements:

| Pair A1-B1 | Pair A2-B2 | Detected Condition Indication |
|---|---|---|
| high ΔT | high ΔT | Normal |
| high ΔT | low ΔT | Fault |
| low ΔT | high ΔT | Fault |
| low ΔT | low ΔT | Alarm |

It will be understood that the operations of the embodiments of FIGS. 12C and 13B as to each related H/T pair thereof, when selected for operation, is as well fully explained by the foregoing equations (1) through (5), with the minor qualification that certain of the typical temperature drops specified in the definitions may vary somewhat, particularly for the configuration of FIG. 13B due to the reduced mass and wall thickness of the individual probes, assuming same to be formed in a housing 310 corresponding otherwise in dimensions and material to the housing 210.

Figure 17:
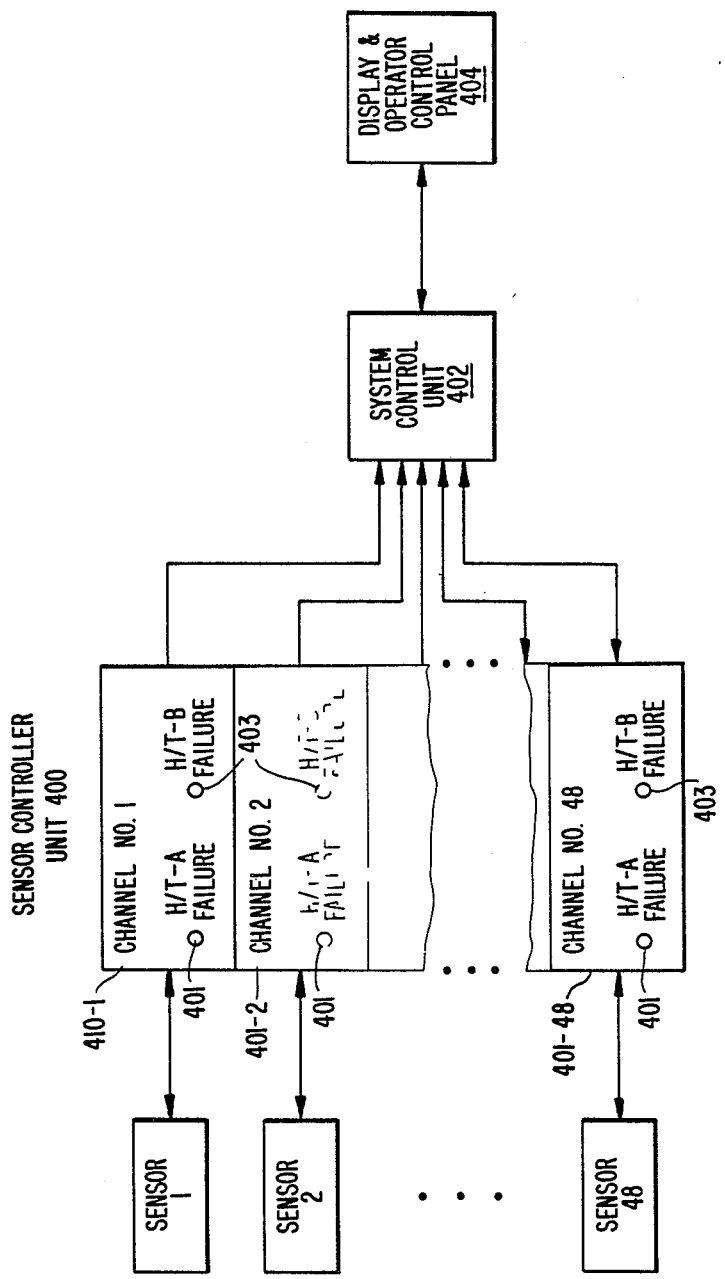
FIG. 17 is a schematic block diagram of a monitor system in accordance with a second embodiment, employing multiple sensors of the integrated split-well type of the above, second through fourth embodiments thereof.
Figure 18:
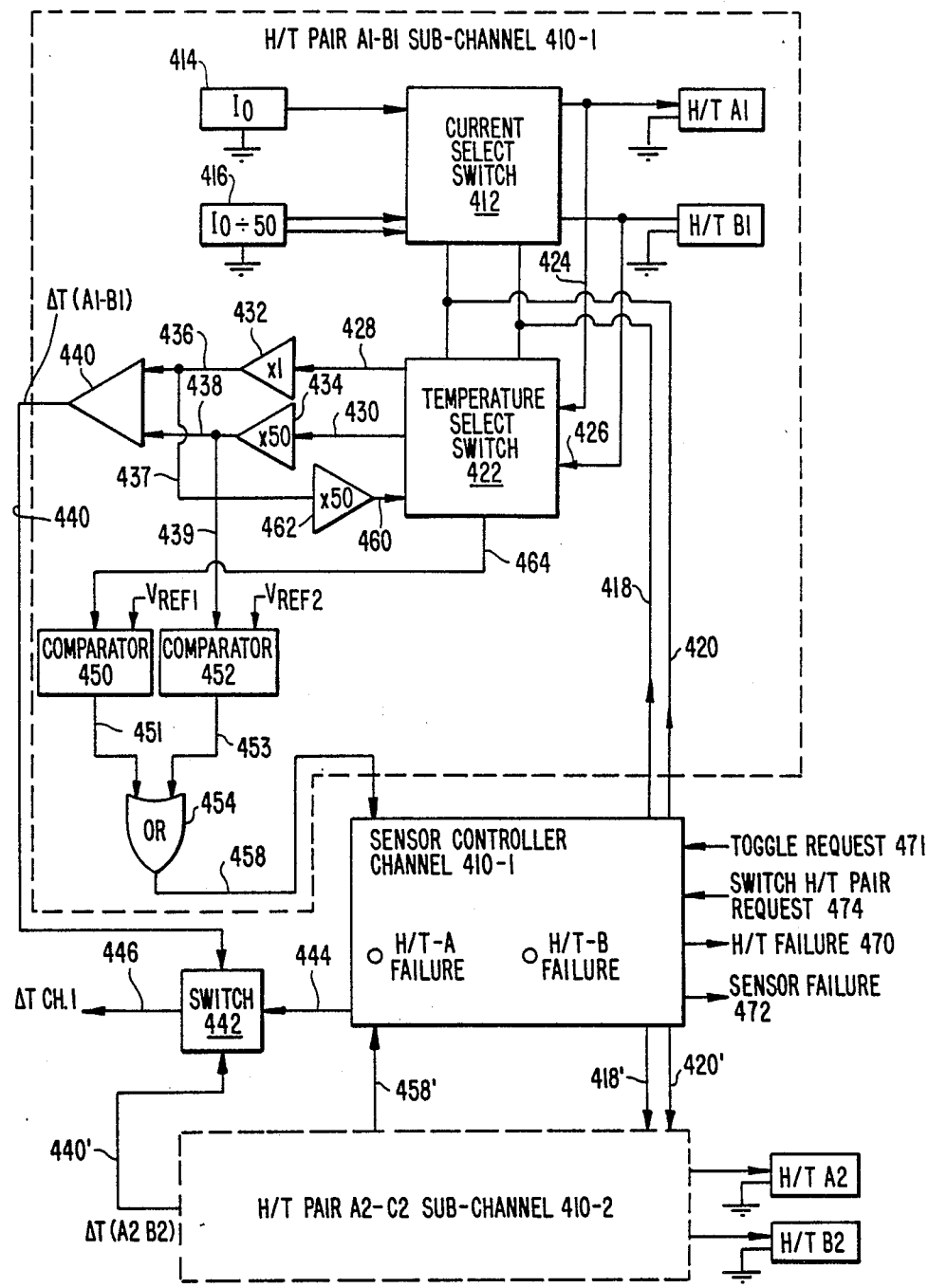
FIG. 18 is a schematic, partially in block diagram form, of the instrumentation and monitoring system of FIG. 9.

A control system and related components, such as a display and operator control panel utilizing the integrated, duplex split-well sensors of the second through fourth embodiments are shown variously in FIGS. 17 and 18. As will be recalled, the embodiment of FIG. 12B has the duplex capability of toggling, whereas the embodiment of FIG. 12C has both that duplex capability and redundancy, permitting automatic substitution of elements and functionally being similar to the first embodiment of FIGS. 1 through 8. The embodiment of FIGS. 13A and 13B, on the other hand, offers yet further capabilities inasmuch as it can function essentially as two independent differential temperature sensors, or detectors. Referring first to FIG. 17, a plurality of integrated sensors, illustratively sensors 1, 2, . . . 48, are connected to respective and correspondingly numbered channels 410 of a sensor controller unit 400, each of the channels 410 in turn being connected to a system control unit 402 and a display and operator control panel 404. Each channel unit of the sensor control unit 400 preferably includes alarm lamps/switches 401 and 403 respectively designating the conditions of a failed H/T A1-B1 pair and of a failed H/T A2-B2 pair, facilitating the identification of the failed such pair for simplifying maintenance. If both H/T pairs of a given sensor have failed, the channel correspondingly is disabled and is so displayed at the panel 404, described earlier.

The display and operator control panel 404 includes a number of modules thereon which may correspond substantially identically to the modules 130, 152 and 170 of FIGS. 11A through 11C, the principal exception being that the read-out control module 130 of FIG. 11A for the integrated sensors has an indication merely of a "failed H/T element" in lieu of the "failed heater or TC" designation associated with lamp/switch 136. It will be understood in this regard that since the integrated sensors of the third and fourth embodiments duplicate the differential temperature sensing functions of the first embodiment, all of the operating functions of the latter likewise may be performed with essentially the identical manual and/or automatic controls, all as hereinbefore described. The system control unit 402 of FIG. 17 interfaces between panel 404 and effects selection of the H/T pairs of the individual channels of the sensor controller unit 400, either automatically or in response to operator-selected manual control inputs at the display and operator control panel 404, as described previously with respect to the monitor system of FIGS. 9, 10 and 11A–11C.

FIG. 18 illustrates the control circuitry of a single sensor control channel 410, e.g., channel number 1, of the sensor controller unit 400 of FIG. 17. Recalling the duplex nature of the integrated sensors, a single such channel controller 410 comprises two identical sub-channels, as delineated in FIG. 18 and identified by the designations "H/T pair A1–B1 channel 410-1 and H/T pair A2–B2 sub-channel 410-2." Since the sub-channels 410-1 and 410-2 are identical, only the A1–B1 sub-channel is shown in detail. The sensor channel controller 410 selects between and controls the operations of the two associated sub-channels 410-1 and 410-2 and interfaces directly with the system control unit 402 of FIG. 18, in a manner to be described.

Current select switch 412 selectively connects the $I_0$ current source 414 and the $I_0 \div 50$ current source 416 to the H/T elements A1 and B1, under control of the channel controller 410 over leads 418 and 420. The H/T temperature select switch 422 receives the voltage level signals from H/T A1 and H/T B1 over signal lines 424 and 426 and processes same, in a manner to be described, under control of the sensor channel controller 410 through corresponding signals over the lines 418 and 420.

Particularly, when the control signal on line 418 is high (418' is low), the H/T element pair A1–B1 is selected to be operational, whereas the H/T element pair A2–B2 is on standby. (Conversely, when line 418' is high and line 418 is low, then H/T element pair A2–B2 (i.e., sub-channel 410-2) is selected to be operational.) A high signal on line 420 then causes switch 412 to supply current $I_0$ from source 414 to H/T element A1 and the $I_0 \div 50$ current from source 416 to H/T element B1. (If the signal on line 420 is low, the reverse connection is made.) Accordingly, channel controller 410 can selectively toggle the H/T element pair A1–B1 (when 418 is high) as between which element is the heated element and which is the reference element. (The signal on line 420' performs a similar role for H/T A2–B2 of sub-channel 410-2.) Typically, sensor channel controller 410 will normally select a given element pair, e.g., H/T A1–B1 (i.e., line 418 is high) with element A1 carrying $I_0$ (line 420 being high), and will respond to an input over input lines 471 and 474 from the system control unit 402 (FIG. 18) to toggle to the opposite selection, i.e., to H/T B1 carrying $I_0$ (heated) or to H/T A2–B2 being active. When the signals on lines 418' and 420' are high (418 and 420 low), switch 412 supplies the $I_0 \div 50$ current from source 416' to both H/T elements A2 and B2.

Assuming that H/T element pair A1–B1 is selected by the high signal on line 418, and element A1 carries $I_0$ (line 420 is also high) the temperature selection switch 422 supplies the respective, higher and lower voltage outputs of the H/T element pair A1–B1, as received over lines 424 and 426, to the output lines 428 and 430, respectively, those outputs being processed by multiplying circuits 432 and 434, which may be operational amplifiers having respective multiplication factors of "×1" (i.e., "times 1") and "×50" (i.e., "times 50") as indicated. The respective outputs on lines 436 and 438 thus are made to correspond in magnitude, with the exception of any temperature difference sensed by the respective H/T elements A1 and B1, for differential comparison by differential amplifier 440. These circuit operations correspond to those described with reference to FIG. 14 hereinabove, the multiplying circuit 434 and the differential amplifier 440 corresponding to elements 94" and 98', respectively, in FIG. 14. The temperature select switch 422 of course directs the outputs of the H/T A1, B1 in accordance with their selection as reference and heated elements. Thus, for example, if line 420 goes low, the voltage output of H/T B1 on line 426 is larger than that on line 424 and accordingly the switch 422 directs the former to output line 428 and the latter to output line 430. Thus, amplifier 434 always receives the output voltage of the elements of the reference probe as defined by the supply of the $I_0 \div 50$ current to the H/T element of that reference probe.

The resultant output of differential amplifier 440 is a signal representative of the temperature differential $\Delta T$, of the respective temperatures sensed by the H/T element pair A1, B1, here $\Delta T = k \Delta V$. The $\Delta T$ output further is supplied over line 440 to switch 442 which is operated over control line 444 by the sensor channel controller 410 to selectively connect the output of the corresponding sub-channel 410-1 or 410-2, which currently is selected for operation, to the channel output line 446 by the 474 input line to controller 410 and thus to supply the $\Delta T$ signal on that line for transmission to the system control unit 402 and the display and operator control panel 404 in accordance with FIG. 17.

The sensor channel controller 410 simultaneously performs an error check and verification function, as to the operating channel and the $\Delta T$ output condition produced thereby, and monitors and verifies the operational status of all four H/T elements of its associated, integrated sensor and the respective support circuits thereof.

The error check and channel operability verification functions take into account the normal range of voltage levels in both operational and standby conditions of the H/T element pairs of both sub-channels. Considering first the most typical source of error, namely breaking of electrical leads or burn-out and disablement of the heater elements, and as may be visualized from the schematic of FIG. 14, there results essentially an open circuit condition. Because of the character of the constant current sources 97' and 94', the corresponding bridge output voltage $V_a$ or $V_b$, corresponding to the respective H/T element and/or its supporting circuitry which is now in an open circuit condition, approaches the so-called "rail voltage" of the current sources 97' and 94', i.e., the highest voltage to which that source will rise in attempting to maintain the constant current condition. With reference to FIG. 14, the rail voltage for example may be 150 volts for the $V_a$ output in the branch receiving $I_0$ and 12 volts for the $V_b$ output for the leg receiving $I_0 \div 50$. The normal operating voltage range for $V_a$ on the other hand would be 50 to 125 volts and for $V_b$, 1 to 2.5 volts. Conversely, a short circuit of either or both of the H/T elements will produce an output $V_a$ and $V_b$ at or approaching zero (0) volts. Accordingly, an operative range of the output voltage $V_a$ may be defined as that range extending from a lower limit threshold voltage of 25 volts to an upper limit threshold voltage of 125 volts. Similarly, for the output voltage $V_b$, the operative range would be defined by a lower limit threshold voltage of approximately 0.5 volts and an upper limit threshold voltage of 2.5 volts. As will be recalled, however, the lower level output voltage $V_b$ is normalized relatively to the voltage $V_a$ by the ($\times 50$) circuits 434 and 462 in FIG. 18. Thus, the reference voltages $V_{REF1}$ AND $V_{REF2}$ supplied to comparator circuits 450 and 452 in FIG. 18 both define lower and upper limits of 25 and 125 volts, respectively, as the respective operative range references for the voltage outputs of the H/T elements A1 and B1.

Considering first the circumstance in which the H/T element pair A1–B1 is operational, and further that the signal on line 420 is high such that element A1 receives the high level current $I_0$, temperature select switch 422, in addition to supplying the voltage output of element A1 on line 428, supplies that same voltage output on line 464 to comparator 450. The low level output of element B1, which is supplied with the $I_0 \div 50$ current, is applied through line 430 to multiplier 434, as before, and the multiplied output is supplied to comparator 452 over line 439. Both voltages on lines 464 and 434 should thus be within the range established by $V_{REF1}$ and $V_{REF2}$ (i.e., 25 to 125 volts). If either is not, the corresponding comparator 450 or 452 produces an error signal on the respective outputs 451 and 453. OR gate 454 passes any such error output through line 458 to the controller 410. When elements A1 and B1 are toggled, the opposite circuit paths for the respective outputs are followed, With the same result.

In the circumstance that the signal on line 418 is low, the element pair A1–B1 is not selected and thus is in a standby condition. Both elements A1 and B1 are supplied with the $I_0 50$ current from source 416 by switch 412 and thus the respective voltage outputs should be of the same low level. Under that circumstance, switch 422 transfers the output voltage on line 424 to line 428 and that on line 426 to line 430. Temperature selection switch 422 in this instance now selects input 460, which receives the signal on line 436 through line 437 and a $\times 50$ multiplying circuit 462, and supplies the multiplied signal over line 464 to comparator 450 for comparison against the reference $V_{REF1}$. The output voltage on line 430 from switch 422 corresponds in its normal range of values to that for the unheated element of the reference probe when the element pair H/T A1–B1 was selected; thus, as before, that output signal is multiplied by the ($\times 50$) circuit 434 and applied through line 435 to comparator 452. Correspondingly, the same lower limit and upper limit threshold voltages and range therebetween, as supplied by $V_{REF1}$ and $V_{REF2}$, remain applicable for determining operability of the H/T elements A1 and B1 in the standby condition, as well.

As will be apparent, any failure of the operational and supporting circuits for the H/T elements A1 and B1, e.g., the current supplies 414 and 416, the switches 412 and 422, or the like —whether the element pair A1–B1 is selected for operation or is in standby, and correspondingly for the pair A2–B2—will result in an error signal on line 458. Sensor channel controller 410 sends the corresponding error signal over output lead 470 to the system control unit 402 (FIG. 18), to indicate the failure of an H/T pair of a given sub-channel (e.g., sub-channel 410-1 as element pair H/T A1–B1 and sub-channel 410-2 as element pair H/T A2–B2). Similarly, an error signal is transmitted over output line 472 to indicate failure of the entire sensor channel, in the event that both sub-channels of a given channel fail. Sensor channel controller 410, moreover, either internally upon detection of a failure of an element pair of one sub-channel, or in response to a request to switch H/T element pair control signal received over line 474 from the system control unit 402, switches to the other sub-channel currently in standby. Of course, where both sub-channels are in a failure condition, operator intervention is required.

Sub-channel 410-2, as before-noted, is effectively identical to sub-channel 410-1 and thus undergoes the same operations and signal communications over the corresponding signal lines, as are similarly oriented in FIG. 18 and identified by identical, but primed, reference numbers. Error checking functions as between the two sub-channels 410-1 and 410-2 are performed continuously.

As will be apparent, the system of FIG. 20 provides the same condition-indicating signals for the respective sub-channels 410-1 and 410-2 and H/T element pairs as does the monitoring system of the system of FIGS. 9 to 12C, and thus is fully operational in the automatic and operator control modes as described hereinabove. The integrated sensors, however, afford simplified interconnections and signal processing relative to the prior described system, contributing to improved reliability and lower costs of installation, maintenance and operation while affording the same flexibility and reliability of the monitoring and verification functions.

In conclusion, the monitoring systems of the invention provide a display of an alarm condition for a given sensor, as produced by the first, normally selected and active element pair but subject to automatic verification thereof by the toggle test utilizing the complementary, second heater element, while performing continuous on-line testing and both automatic detection of element failures with issuance of appropriate failure indications and automatic substitution of the complementary elements, such that all sensor locations are constantly monitored and diagnosed and in a ready condition to provide alarm indications, while furthermore eliminating false alarms that may otherwise result from component failure. In addition to the automatic and continuous on-line testing, operator-controlled selective testing modes are provided. Important to these capabilities of the systems is the duplex character and toggling capability of the sensors of the invention. In addition to their rugged construction assuring long life, the sensors afford on-line replaceability of failed heater and sensor elements, the duplex and redundant sensors remaining fully functional by automatic substitution of the complementary elements thereof. Numerous modifications and adaptations of the sensors and the instrumentation system of the present invention will be apparent to those of skill in the art and thus it is intended by the following claims to cover all such modifications and adaptations which fall within the true spirit and scope of the invention.

I claim as my invention:

1. An instrumentation system for monitoring fluid conditions within the interior of a pressure vessel, comprising:
   at least one duplex differential temperature sensor comprising at least one pair of two substantially identical probes in communication with the fluid condition within the interior of the pressure vessel and two complementary sets of heater and temperature sensing elements, each such set being associated with a given pair of probes, the heater element being in one of the probes of the associated pair of probes and both probes of the pair having respective temperature sensing elements of the complementary set therein, and selectively operable, when energized, to heat the one probe, the one probe thus being a heated probe and the other probe being a reference probe, and to sense the temperatures of the heated and reference probes of the given pair and produce corresponding, sensed temperature outputs having a temperature differential therebetween, the temperature differential being of respectively higher and lower values in response to exposure of the pair of heated and reference probes of the sensor to steam and water conditions within the pressure vessel interior;
   means for selectively energizing the heater element of a given one of the complementary sets of heater and temperature sensing element of a given sensor;
   means for determining the temperature differential between the sensed temperature outputs of a given one of the complementary sets and producing a corresponding, sensed temperature differential output; and
   control means, operative during a normal monitoring mode, for selecting one of the two complementary sets of the at least one sensor as an operative set and for maintaining the other of the two complementary sets thereof in a standby condition, the control means controlling the selective energizing means to energize the selected set and controlling the temperature differential determining means to determine the differential between the sensed temperature outputs of the selected set and produce a corresponding, sensed temperature differential output.

2. A system as recited in claim 1, further comprising:
   means for determining the inoperability of any of the temperature sensing and heater elements of the complementary sets of any of the at least one given sensor and producing a corresponding inoperable element output; and
   the control means responding to the inoperable element output of the inoperable element determining means in the normal monitoring mode and corresponding to the selected, operative set of the given sensor, for selecting the other of the complementary sets theretofore maintained in standby condition as the operative set and controlling the selective energizing means to energize, and the temperature differential determining means to determine the difference between the sensed temperature outputs of, the thus selected, other set.

3. A system as recited in claim 2, further comprising:
   sensor display means, responsive to the inoperable element output, for producing a display indication of the inoperable element.

4. A system as recited in claim 1, further comprising:
   means for defining a reference temperature differential value intermediate the relatively higher and lower values of the sensed temperature differential outputs of the determining means produced in response to the sensed temperature outputs of the given set and respectively corresponding to exposure of the associated pair of probes of the sensor to steam and water conditions within the pressure vessel interior; and
   means for comparing the value of the sensed temperature differential output of the determining means, produced in response to the sensed temperature outputs of the selected, operative set, with the reference temperature differential value and producing an alarm output when the sensed temperature differential output is less than the reference temperature differential value.

5. A system as recited in claim 4, wherein:
   the control means is operative in a verification mode, in response to the alarm output of the comparing means, for selecting the other, complementary set of elements theretofore in standby condition and for controlling the energizing means to energize, and the determined means to determine the difference between the sensed temperature outputs of, the other, thus selected complementary set and produce a corresponding, sensed temperature differential output.

6. A system as recited in claim 5, further comprising:
   means for comparing the respective, sensed temperature differential outputs of the determining means produced for the given sensor in the monitoring mode and in the verification mode as a result of the alarm output for the given sensor, to verify the alarm condition.

7. A system as recited in claim 6, further comprising:
   means responsive to the alarm output for producing an alarm indication display.

8. A system as recited in claim 1, wherein:
   means for determining the inoperability of any of the temperature sensing and heater elements of the complementary sets of a given sensor and producing corresponding inoperable element outputs; and
   the control means is selectively operable, during on-line testing in a normal monitoring mode, for selecting the other, complementary set theretofore in standby condition as the operative set and for controlling the selective energizing means to energize, and the temperature differential determining means correspondingly to determine the difference between the sensed temperature outputs of, the thus, alternatively selected, other complementary set.

9. A system as recited in claim 8, further comprising:
   plural differential temperature sensors and respectively associated energizing means and temperature differential determining means, the control means comprising system control means and plural sensor control means respectively associated with the plural sensors and the system control means controlling the plural sensor control means to perform on-line testing of the respectively associated sensors.

10. A system as recited in claim 9, further comprising:
    means for comparing the temperature differential outputs respectively produced during the normal monitoring mode and during on-line testing, by each of the plural temperature differential test the operability of the respectively corresponding sensors.

11. A system as recited in claim 10, further comprising;
system display means for displaying the respective temperature differential outputs, during the normal monitoring mode and during on-line testing, of each of the plural temperature differential determining means in association with the identification of the respective sensor, for each of the plurality of sensors.

12. A system as recited in claim 11, wherein:
the system display means displays the temperature differential output for only a single, selected set of a single sensor; and
in each of the monitoring mode and on-line testing, the system control means selects, in individual succession, the plural sensor control means and correspondingly the respectively associated plural temperature differential sensors and plural determining means, and supplies the respective differential temperature outputs therefrom, corresponding to the selected set of each sensor in the monitoring mode and the complementary set of each sensor in on-line testing, to the system display means for display in corresponding, individual succession and in conjunction with the identification of the selected sensor.

13. A system as recited in claim 11, wherein the system display means further comprises:
plural alarm indication display means respectively corresponding to the plural sensors, each such corresponding alarm indication sensor display means providing an indication of an alarm condition in association with the respective sensor.

14. A system as recited in claim 13, further comprising:
means associated with each sensor for determining inoperability of any of the temperature sensing and heating elements of the complementary sets thereof and producing corresponding inoperable element outputs;
each of the plural sensor control means being operable in response to an inoperable element output of the corresponding inoperability determining means as to a selected, operative set, for producing an inoperative set output, and in response to receiving an inoperable element output of the inoperability determining means for both of the complementary sets, for producing a failed sensor output;
the system control means supplies the failed set and failed sensor outputs of the plural sensor control means in conjunction with the identification of the corresponding sensor to the system display means; and
the system display means further comprises means for separately displaying failed set and failed sensor indications in conjunction with the identification of the corresponding sensor in response to receipt of failed set and failed sensor outputs, respectively.

15. A system as recited in claim 9, further comprising:
operator control means for selectively controlling the system control means to perform selective on-line testing of the plurality of sensors 16. A system as recited in claim 1, wherein:
each of the probes of the at least one pair has disposed therein a heater element positioned centrally therein and two temperature sensing elements positioned symmetrically with respect to the heater element, the heater element and one of the temperature sensing elements of one probe and one of the two temperature sensing elements of the other probe of the pair of probes being associated as a first complementary set and the heater element of the other probe of the pair and the remaining temperature sensing element of the one probe of the pair being associated as the second complementary set.

17. A system as recited in claim 1, wherein:
each complementary set comprises a pair of integrated heater/temperature sensing elements;
each probe of the pair of probes of a sensor has a pair of integrated heater/temperature sensing elements disposed therein, each such integrated element having a resistance value substantially linearly dependent on temperature and operable as a temperature sensing element for producing a sensed temperature output, and being selectively operable, when energized, to function as a heater element for heating the associated probe, each such integrated heater/temperature sensing element of one of the at least one pair of probes being associated with an integrated heater/temperature sensing element of the other, related probe of the pair thereby to define first and second complementary sets of integrated heater/temperature sensing elements for the pair of probes of the sensor;
the control means, in a normal monitoring mode and for a given sensor, selects the first complementary set of integrated heater/temperature sensing elements for operation, the second set thereof remaining in standby condition, and controls the energizing means to energize one of the integrated heater/temperature sensing elements of the selected set.

18. A system as recited in claim 17, further comprising:
means for determining the inoperability of any of the integrated heater/temperature sensing elements of the complementary sets of a given sensor and producing corresponding inoperable element outputs; and
the control means is responsive to an inoperable element output of the inoperability determining means, during a normal monitoring mode and for the selected set of integrated heater/temperature sensing elements of the given sensor, for selecting the other such set thereof theretofore in standby condition, and for controlling the energizing means to energize one of the integrated heater/temperature sensing elements of the thus selected, other set.

19. A system as recited in claim 17, wherein the energizing means comprises:
a bridge circuit having first and second legs, each connected between first and second junctions and therefore in parallel relationship with the other;
first and second constant current sources connected in series with respective first and second heater/temperature sensing elements of a complementary set thereof in the respective first and second legs, the series connections in the respective first and second legs defining third and fourth junctions;
the first constant current source supplying current to the first element in the first leg, of a first level sufficient to energize same as a heater element;

the second constant current source connected in the second leg supplying the second element with a second level of current, lower by a predetermined proportionality factor relatively to the first level of current such that the second heater/temperature sensing element is heated only insignificantly by the current flow therethrough of the second level;

a differential amplifier having first and second inputs and an output;

means for connecting the third and fourth junctions of the bridge network to the first and second inputs of the differential amplifier and for normalizing the respective voltage outputs at the third and fourth junctions in accordance with the first and second levels of current flow through the respective first and second heater/temperature sensing elements, effectively by the inverse of the proportionality factor; and the differential amplifier producing a sensed temperature differential output representative of the difference between the respective sensed temperature outputs of the integrated heater/temperature sensing elements of the complementary set.

20. A system as recited in claim 17, wherein the energizing means comprises:

means for supplying the first and second integrated heater/temperature sensing elements of the given complementary set with respective, high and low level constant currents differing by a known proportionality factor to produce corresponding high and low level voltage outputs therefrom as the respective sensed temperature outputs thereof, the high level current producing sufficient heating of the first integrated heater/temperature sensing element to enable it to function as a heater and its corresponding probe to function as a heated probe and the low level current producing insignificant heating of the second integrated heater/temperature sensing element and its associated probe for functioning as a reference probe.

21. A system as recited in claim 20, wherein the temperature differential determining means further comprises:

means for altering the relative levels of the respective voltage outputs of the first and second integrated heater/temperature sensing elements by the inverse of the known proportionality factor, in determining the difference between the sensed temperature outputs and producing the corresponding sensed temperature differential output.

22. A system as recited in claim 21, wherein the inoperable element determining means comprises:

means providing a continuous reference range of voltage values corresponding to the range of sensed temperature output voltage values of an operative, integrated heater/temperature sensing element; and means for comparing the sensed temperature output voltage of each integrated heater/temperature sensing element with the continuous reference range of voltage values and producing the an inoperable element output when the sensed temperature output voltage is not within the continuous reference range.

23. An instrumentation system for monitoring fluid conditions within the interior of a pressure vessel, comprising:

at least one duplex differential temperature sensor having a pair of first and second substantially identical probes integrally interconnected at first ends thereof and extending in parallel axial relationship and spaced by a bilateral plane and adapted to be mounted to the sidewall of a pressure vessel with the probes in communication through a penetration in the sidewall with the fluid state within the interior of the pressure vessel, each said probe incorporating a heater element and a pair of associated temperature sensing elements, the heater element and a selected temperature sensing element of said first probe and a selected temperature sensing element of said second probe comprising a first differential temperature sensor component and the heater element of the said second probe and a selected temperature sensing element thereof and a selected temperature sensing element of said first probe comprising a second differential temperature sensor component:

heater controller means for selectively supplying electrical power to said respective heater elements of said first and second probes of said sensor, the selected heater element heating the corresponding probe and raising the temperature thereof, in the absence of a fluid in the line contacting and dissipating heat from the probe, and thereby producing a difference between the temperatures sensed by the selected temperature sensing elements associated with the respective, heated and unheated probes of the sensor, said heater controller means further comprising means for determining operability of each of the heater elements of the sensor and producing an inoperative heater element output upon determining the inoperability of a heater element;

temperature sensing element controller means for selecting the temperature sensing elements of the first and second probes and for monitoring the sensed temperature outputs of the selected temperature sensing elements, for providing a differential temperature output indicative of the difference between the respective, sensed temperature outputs of the selected temperature sensing elements of the first and second probes, and for determining the operability of the selected temperature sensing elements of the first and second probes; and system control means for controlling said heater and temperature sensing element controller means to select the heater and sensing elements of each sensor corresponding to the first sensor component thereof in a normal monitoring mode of the instrumentation system, for defining a normal differential temperature output condition, for detecting an alarm condition in the normal monitoring mode when the differential temperature output of the selected, first sensor component differs from the normal differential temperature condition, and for producing an alarm output in response to detecting an alarm condition;

display means responsive to an alarm output of said system control means for producing an alarm display identified with the corresponding sensor; and said system control means being responsive to an inoperative heater element output from said heater controller for the selected heater of said first probe, corresponding to the first sensor component, for automatically causing said heater controller to select the heater element of the second probe and supply electrical power thereto and thereby to switch from the first to the second sensor component of the given sensor.

24. A system as recited in claim 23, wherein:
said system control means, in response to detecting an alarm condition and for verifying same, directs said heater controller to select the second heater element and thereby switch to the second sensor component, for comparing the differential temperature output indication produced by the temperature sensing element controller for the second sensor component with that for the first sensor component for verification of the detected alarm condition, as a qualifying condition for producing the alarm indication for the corresponding sensor.

25. A system as recited in claim 24, comprising plural said sensors, and wherein said system control means, in an automatic test mode, performs on-line testing of each sensor, in sequence, for said plurality of sensors.

26. A system as recited in claim 25, wherein:
said system control means, for performing the automatic mode of on-line testing of each sensor, determines and stores the respective differential temperature outputs of the first sensor components of the plurality of sensors in a normal operating mode, causes said heater controller means and said temperature sensing controller means to switch to the respective, second sensor components of the plural sensors for selectively supplying electrical power to the heater elements of the respective second probes of the plurality of sensors for a sufficient period of time to establish thermal stability of the second sensor components, determines the corresponding differential temperature outputs thereof and compares same with the respective differential outputs of the first sensor components of the respective sensors, and detects a sensor failure condition when the respective differential temperature outputs of the first and second sensor components of a given sensor, under test, do not have the same numerical value and opposite sign.

27. A system as recited in claim 26, further comprising:
means for selectively displaying the numerical value and sign of the sensed temperature differential output of each sensor;
means for displaying an indication of a failed sensor;
means for displaying an indication of a failed heater element; and
means for initiating a selective test mode, in lieu of the automatic test mode, for on-line testing of selected, said sensors.

28. A system as recited in claim 26, further comprising:
plural alarm display means respectively corresponding to said plural sensors, for indicating an alarm condition sensed by the corresponding sensor; and
for selectively testing a given sensor in the selective test mode of the system, said system control means causes said heater controller means and said temperature sensing element controller means to switch to the second sensor component of the given sensor, thereby to enable selective display of the value and sign of the differential temperature output of the second sensor component produced thereby in the selective test mode for comparison with the corresponding display of the output of the first sensor component produced in the normal monitoring mode of the system.

29. A system as recited in claim 23, wherein:
said temperature sensing element controller means selects the same temperature sensing elements, conditioned on continued operability thereof, for both the first and second sensor components of each said sensor.

30. A system as recited in claim 29, wherein:
said temperature sensing element controller means selects the complementary temperature sensing elements of the sensor for each of said first and second sensor components of a given sensor upon the detection of a failure of either of the first selected temperature sensing elements.

* * * * *